US006832367B1

(12) United States Patent
Choi et al.

(10) Patent No.: US 6,832,367 B1
(45) Date of Patent: Dec. 14, 2004

(54) METHOD AND SYSTEM FOR RECORDING AND REPLAYING THE EXECUTION OF DISTRIBUTED JAVA PROGRAMS

(75) Inventors: Jong-Deok Choi, Mount Kisco, NY (US); Ravi Konuru, Tarrytown, NY (US); Harini Srinivasan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,008

(22) Filed: Mar. 6, 2000

(51) Int. Cl.[7] ............................................. G06F 9/44
(52) U.S. Cl. ..................................... 717/130; 717/124
(58) Field of Search .......................... 717/124–131, 717/147–149; 709/203, 227, 231, 328, 1, 100, 102, 106, 205, 450

(56) References Cited

U.S. PATENT DOCUMENTS

| | | | |
|---|---|---|---|
| 5,899,990 A | * | 5/1999 | Maritzen et al. ............... 707/4 |
| 6,101,524 A | * | 8/2000 | Choi et al. ................... 709/102 |
| 6,223,202 B1 | * | 4/2001 | Bayeh ......................... 709/102 |
| 6,374,402 B1 | * | 4/2002 | Schmeidler et al. ......... 717/167 |
| 6,470,494 B1 | * | 10/2002 | Chan et al. .................. 717/166 |
| 2003/0061398 A1 | * | 3/2003 | Wilson et al. ............... 709/318 |

OTHER PUBLICATIONS

"TCP/IP Illustrated vol. 1, The Protocols", W. Richard Stevens, 1994, Addison Wesley Longman, Inc., p. 496–497.*
Stevens, W. Richard, "TCP/IP Illustrated, vol. 1 The Portocols", 1994 Addison Wesley.*
Roos, J.F., Courtrai, L., and Mehaut, J.F., "Execution Replay of Parallel Programs", 1992 IEEE, p. 429–434, retrieved from IEE database Aug. 18, 2003.*
Buhr, Peter A., Karsten, Martin, and Shis, Jun, "KDB: A Multi–threaded Debugger for Multi–threaede Applications", 1996, ACM, p. 80–87, retreived from AMC Portal Database Aug. 18, 2003.*
Chan, Patrick, "The Java Developers Almanac, The Java Series . . . from the Source", 1998, Addison Wesley.*
Choi, Jon–Deok and Srinivasan, Harini, "Deterministic Replay of Java Multithreaded Applications", 1998 ACM, p. 1–12, retrieve from google.com Aug. 18, 2003.*
Konuru, Ravi, Srinivsan, Harini, and Choi, Jong–Deok, "Deterministic Replay of Distributed Java Applications", May 2000, IBM Thomas J. Watson Research Center, retrieved from google.com search Aug. 18, 2003.*

* cited by examiner

Primary Examiner—Antony Nguyen-Ba
Assistant Examiner—Mary J. Steelman
(74) Attorney, Agent, or Firm—Richard M. Ludwin, Esq.; McGinn & Gibb, PLLC

(57) ABSTRACT

A method for recording and replaying execution of distributed programs on a computer system in a distributed environment, includes identifying an execution order of critical events of a program, generating groups of critical events of the program, wherein for each group, critical events belonging to the group belong to a common execution thread, and generating for each execution thread a logical thread schedule that identifies a sequence of the groups so as to allow deterministically replaying a non-deterministic arrival of stream socket connection requests, a non-deterministic number of bytes received during message reads, and a non-deterministic binding of stream sockets to local ports.

71 Claims, 9 Drawing Sheets

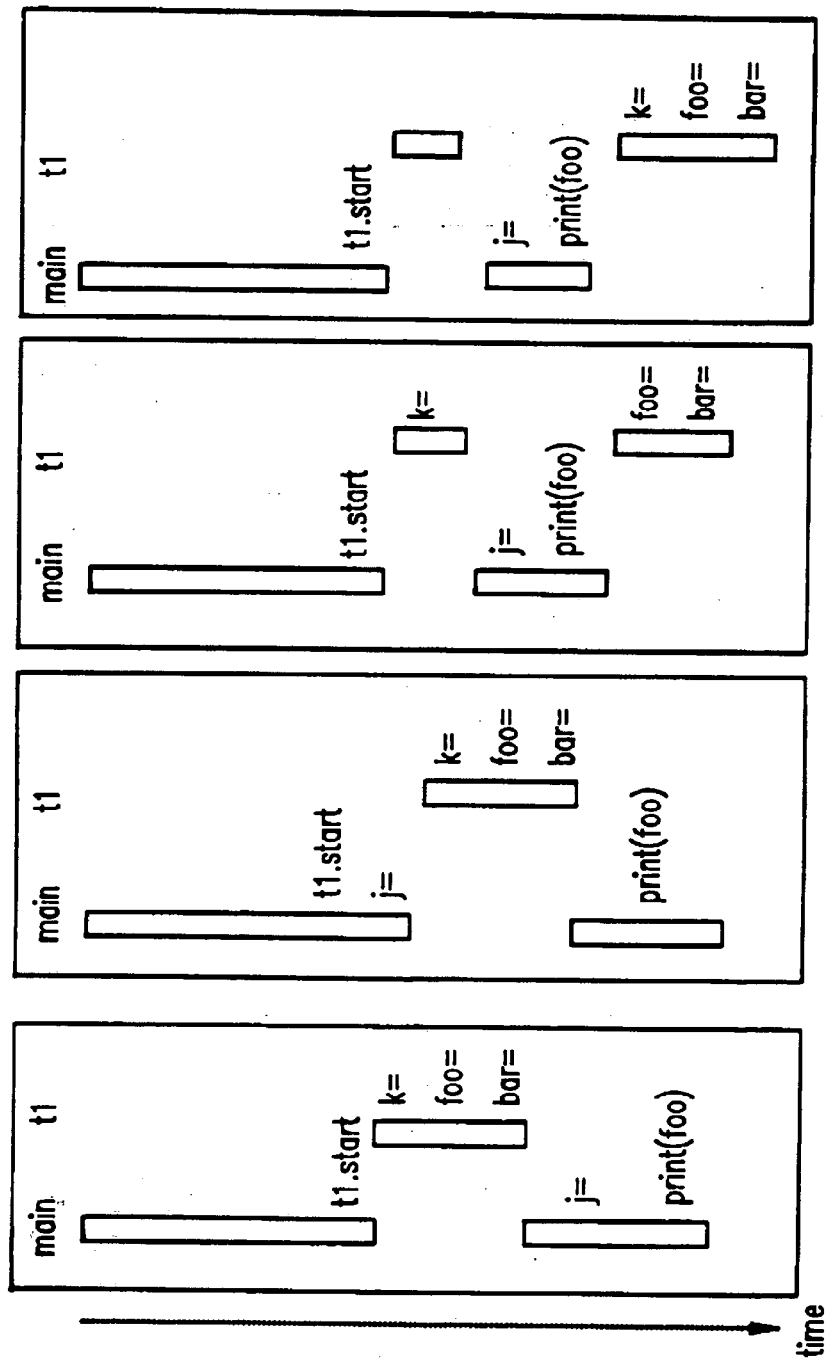

S0: START, i = 0
S1: update FirstCriticalEvent(i) and
    LastCriticalEvent(i)
S2: yield the thread schedule
S3: execute event.
    if CriticalEvent increment global_counter
S4: i = i + 1
S5: END C1: global_counter < FirstCriticalEvent(i)
C2: not C1
C3: global_counter <= LastCriticalEvent(i)
C4: not C3
C5: i <= last interval
C6: not C5

⎯⎯⎯ connection during 1st execution
- - - - connection during 2nd execution

L1: <gS1, Client1Id>, Client1Id = <Client1VMID, gCounterClient1>>
L2: <gS2, Client2Id>, Client2Id = <Client2VMID, gCounterClient2>>
L3: <gS3, Client3Id>, Client3Id = <Client3VMID, gCounterClient3>> read in Record Mode

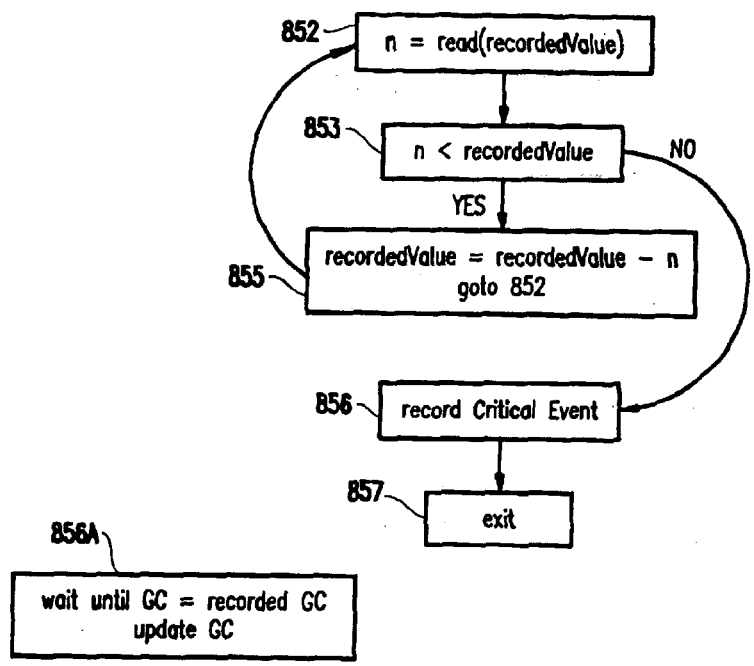
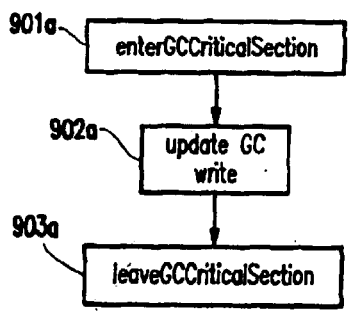
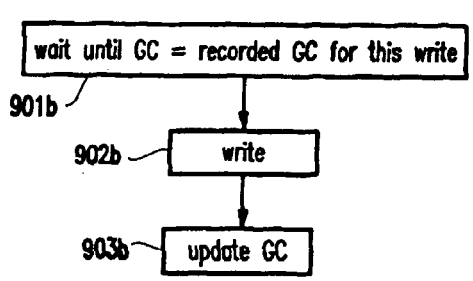

accept and connect in Record Mode

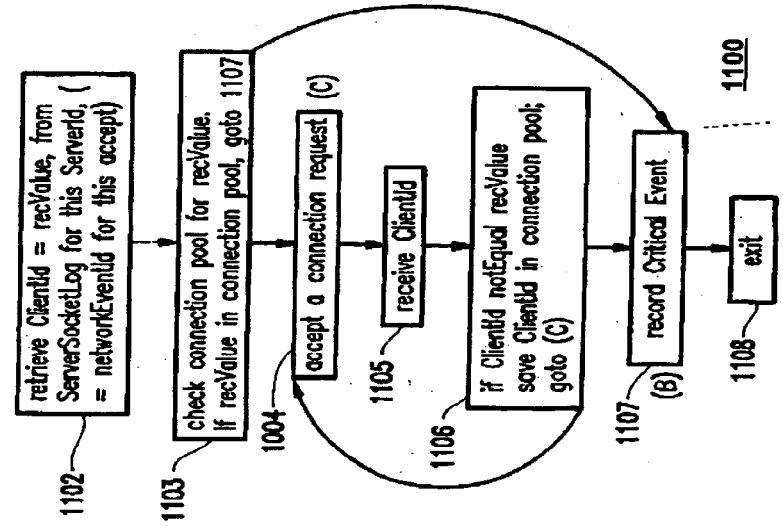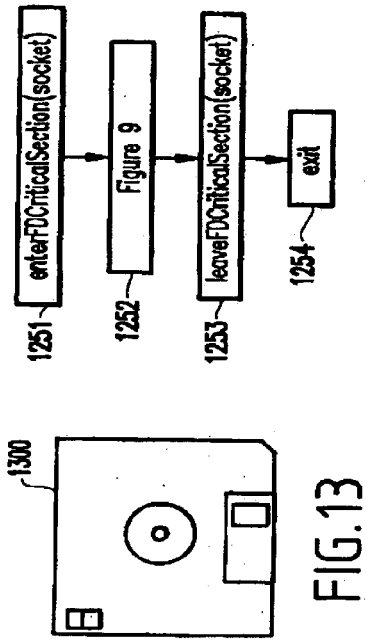

METHOD AND SYSTEM FOR RECORDING AND REPLAYING THE EXECUTION OF DISTRIBUTED JAVA PROGRAMS

CROSS-REFERENCE TO RELATED APPLICATIONS

The present application is related to U.S. patent application Ser. No. 08/956,717, filed on Oct. 23, 1997, to Choi et al., entitled "DETERMINISTIC REPLAY OF MULTI-THREADED APPLICATIONS", now U.S. Pat. No. 6,101,524, and to U.S. patent application Ser. No. 09/569,308, filed on May 11, 2000, to Choi et al., entitled "METHOD AND APPARATUS FOR DETERMINISTIC REPLAY OF JAVA MULTITHREADED PROGRAMS ON MULTIPROCESSORS", both assigned to the present assignee, and incorporated herein by reference.

BACKGROUND OF THE INVENTION

1. Field of the Invention

The present invention relates to computer processing systems, and more particularly to tools, techniques and processes, such as debugging tools and visualization tools, for recording and replaying the execution of distributed programs on such computer processing systems.

2. Description of the Related Art

Distributed programming is a form of information processing in which work is performed by separate computers linked through a communication network.

Typically, a complex set of software services and hardware services that implement a standardized set of communication protocols, such as transfer control protocol (TCP)/Internet Protocol (IP), is used to communicate information over the communication network. A more detailed description of exemplary communication protocols used in today's communication networks can be found in Tanenbaum, "Computer Networks," Prentice-Hall, Inc., Third Edition, 1996, herein incorporated by reference in its entirety The JAVA™ programming language reduces many of the complexities of distributed programming by providing many programmer-friendly features including language-level support for multiple threads of execution within a single program.

Further, standard and relatively simple Application Programming Interfaces (APIs) have been provided in JAVA™ for defining a set of interfaces to the complex set of software services and hardware services used in communicating information over today's communication network. The core communication APIs in Java™ are centered around communication end points called "sockets". The concepts exported and options supported by the Java™ Socket API are essentially a set of higher level abstractions and operations that can be mapped on a simple blocking subset of a low-level, but more powerful, socket-based interfaces offered by operating systems such as UNIX®, the Microsoft Windows®, and the Microsoft NT® operating systems.

In JAVA Socket API, three types of sockets are supported: 1) a point-to-point stream socket that supports reliable, streaming delivery of bytes; 2) a point-to-point datagram or packet-based socket on which message packets can be lost or received out of order; and 3) a multicast (e.g., point-to-multiple-points) socket on which a datagram may be sent to multiple destination sockets. For more details, see "Java Language Specification", J Gosling, B. Joy and G. Steele, Addison Wesley and "Java 1.1 Developer's Handbook", P. Heller, S. Roberts, with P. Seymour and T. McGinn, Sybex.

These features have resulted in the growing use of JAVA for creating application components in JAVA that communicate over the network.

However, the factors of non-determinism introduced by the presence of concurrent threads of execution, operating system scheduling, variable network delays and potentially variable delivery of network messages make the understanding and testing of multi-threaded distributed JAVA application execution a difficult and a laborious process.

Moreover, repeated execution of a program is common while debugging a program and non-determinism may result in a "bug" appearing in one execution instance of the program and not appearing in another execution instance of the same program.

Further, the performance behavior can be different from one execution instance of a program to another execution instance of the same program. Given the size and the number of execution sequences possible in the completion of these distributed programs, it is an extremely difficult task for a programmer to solve correctness and performance problems since it is difficult to reproduce an execution instance.

For example, as mentioned above, replay is a widely accepted technique for debugging deterministic sequential applications. Replay for debugging, however, fails to work for non-deterministic applications, such as distributed and multithreaded Java applications. BUGNET's handling of non-deterministic message sent and received by processes is similar to the handling of User Datagram Protocol (UDP) datagrams (e.g., see R. Curtis and L. Wittie, "BUGNET: A debugging system for parallel programming environments", *Proceedings of the 3rd IEEE International Conference on Distributed Computing Systems*, pages 394–399, 1982). It logs the received message identifications during the record phase, and consumes the received messages according to the log during the replay phase while buffering yet to be consumed messages. However, it does not address the issue of non-deterministic events due to multithreading within a process that interact with non-deterministic message receives, nor does it address non-deterministic partial receive of messages through "reliable" connections.

Additionally, replay systems based on Instant Replay (e.g., see Thomas J. Leblanc and John M. Mellor-Crummy, "Debugging parallel programs with instant replay" *IEEE Transactions on Computers*, C-36(4):471–481, April 1987; and J. Sienkiewicz and T. Radhakrishnan. DDB: A distributed debugger based on replay", *Proceedings of the IEEE Second International Conference on ICAPP*, pages 487–494, June 1996) addresses both non-determinism due to shared variable accesses and messages. Each access of a shared variable, however, is modeled after interprocess communication similar to message exchanges. When the granularity of the communication is very small, such as the case with multithreaded applications, the space and time overhead for logging the interactions becomes prohibitively large. Instant Replay also addresses only atomic network messages like the UDP datagram.

Russinovich and Cogswell's approach (e.g., see Mark Russinovich and Bryce Cogswell, "Replay for concurrent non-deterministic shared memory applications", *Proceedings of ACM SIGPLAN Conference on Programming Languages and Implementation (PLDI)* pages 258–266, May 1996) addresses specifically multithreaded applications running only on a uniprocessor system. They modified the Mach operating system to capture the physical thread scheduling information. This makes their approach highly dependent on an operating system.

Another scheme for event logging (e.g., see L. J. Levrouw, K. M. R. Audenaert and J. M. Van Campenhout, "Execution replay with compact logs for shared-memory systems," *Proceedings of the IFP WG10.3 Working Conference on Applications in Parallel and Distributed Computing, IFIP Transactions*A-44pages 125–134. April 1994) computes consecutive accesses for each object, using one counter for each shared object.

As described in detail below, the unique and unobvious structure and method of the present invention differ from theirs in that the present invention computes a logical thread schedule, using a single global counter. Thus, the inventive scheme is much simpler and more efficient than the conventional techniques on a uniprocessor system.

Further, Netzer et. al. address the issue of how to balance the overhead of logging during the record phase with the replay time (e.g., see R. H. B Netzer, S. Subramanian, and X. Jian, "Critical-path-based message logging for incremental replay of message-passing programs", *Proceedings of the 14th IEEE International Conference on Distributed Computing Systems*, June 1994). Even for a closed world system (e.g., where all components of the distributed application are being replayed), contents of messages are stored selectively to avoid executing the program from the start. Combined with checkpointing (e.g., see Y. M. Wang and W. K. Fuchs, "Optimistic message logging for independent checkpointing in message-passing systems", *Proceedings of IEEE Symposium on Reliable Distributed Systems*, pages 147–154, October 1992), storing contents of messages allows for bounded-time replay to an arbitrary program points.

Accordingly, it is highly advantageous to have methods for recording and replaying a distributed JAVA application so that programmers can easily reproduce application behavior and focus their efforts towards analyzing and solving the problems in application execution. However, hitherto the present invention, such a method (and system) has not been provided to the programmers/users of computer processing systems.

SUMMARY OF THE INVENTION

In view of the foregoing and other problems, drawbacks, and disadvantages of the conventional systems and methods, an object of the present invention is to provide a method and system for recording and replaying the execution of distributed programs (e.g., distributed JAVA r. systems).

Another object is to provide a method for supporting the recording and replaying of distributed JAVA programs and is an improvement and follow-on work to U.S. patent application Ser. No. 08/956, 717 filed on Oct. 23, 1997, entitled "DETERMINISTIC REPLAY OF MULTITHREADED APPLICATIONS" and having IBM Docket No. Y0997-355.

In one aspect of the present invention, a method for recording and replaying execution of distributed programs on computer systems in a distributed environment includes identifying an execution order of critical events of a program, generating groups of critical events of the program, wherein for each group, critical events belonging to the group belong to a common execution thread, and generating for each execution thread a logical thread schedule that identifies a sequence of the groups so as to allow deterministically replaying of a non-deterministic arrival of stream socket connection requests, a non-deterministic number of bytes received during message reads, and a non-deterministic binding of stream sockets to local ports.

In another aspect of the present invention, a method for supporting execution replay with respect to a datagram socket API includes the support for out-of-order delivery of packets, and non-deterministic number of packets delivered during different executions of the same program.

In yet another aspect of the present invention, a method for supporting execution replay with respect to a multicast socket API includes the support for datagrams (packets) being sent to multiple receivers.

These methods may be used by interactive tools such as program debuggers and visualizers to replay specific execution instances of a distributed JAVA application for purposes such as program understanding, visualization and debugging.

With the method and system of the invention, recording and replaying a distributed JAVA application are provided so that programmers can easily reproduce application behavior and focus their efforts towards analyzing and solving the problems in application execution.

Further, the invention provides repeating the exact behavior of thread execution and events in a distributed environment, as opposed to earlier work by the inventors in which behavior was logged only for events of accessing shared variables or synchronizations among threads running on a single machine.

In the conventional systems, there are applications running on Java virtual machines, but there is no mechanism for deterministically replaying the JAVA applications and their threads. With the invention, there is a mechanism for deterministically replaying events in which the JAVA virtual machine is modified to record events. To enable this process, the JAVA virtual machines communicate with one another, and events are recorded on each virtual machine.

Further, while the co-pending application mentioned above guarantees the same order of messages sent, the present invention records an arrival ordering which guarantees the same order of messages received by each thread, and, thereby, the replay of applications. Indeed, the present invention extends the capabilities of the earlier invention to network-related communication by making sure that messages are received by each thread during the replay mode in the same order as they are received during the record mode.

Hence, when JAVA application programs are running on two or more different microprocessors (e.g., JAVA Virtual Machines) in a networked environment, the invention provides a method and system for achieving a deterministic replay under such a scenario.

The invention provides such a capability by changing (modifying) the implementation of the virtual machines to record what transactions are occurring at the application level and uses this information the next time around to replicate the same behavior. Thus, the application: itself is not being changed, but only the implementation of the virtual machines.

Hence, in contrast to the related work which addressed only the issue of a plurality of threads which were running on a single virtual machine and capturing a data set to execute replay, the present invention is directed to a plurality of (e.g., two) virtual machines having applications on each machine and having threads of a same JAVA application program running, and recording events to provide a deterministic replay of events on all these virtual machines.

Thus, for example, given three components of a distributed application (component1, component1 and component3) running on virtual machines VM1, VM2 and VM3 respectively and communicating via sockets, the invention provides deterministic replay such that the correct messages are delivered to each component (component1, component2 and component3) of the said distributed application. Hence, while the related work guarantees the sending order, the present invention records the arrival ordering, and guarantees order and replay of the specific applications.

Such is achieved by the plurality of machines recording events at each machine, and each machine communicating with one another, and thus the order of the replay of the application on multiple virtual machines can be guaranteed.

BRIEF DESCRIPTION OF THE DRAWINGS

The foregoing and other objects, aspects and advantages will be better understood from the following detailed description of a preferred embodiment of the invention with reference to the drawings, in which:

FIGS. 2(a)–2(d) illustrates exemplary physical thread schedules for an exemplary program;

FIGS. 8(a) and 8(b) respectively illustrate a flowchart for implementing a record and replay for a read;

FIGS. 9(a) and 9(b) respectively illustrate a flowchart for implementing a record and replay code for a write.

FIG. 11 illustrates an "accept process" in replay mode for a server;

FIGS. 12(a) and 12(b) respectively illustrate an exemplary flowchart for implementing a more efficient record and replay code of a read and a record and replay code for a write and FIG. 13 illustrates a programmable storage medium 1300 for storing a program of the method according to the present invention.

DETAILED DESCRIPTION OF PREFERRED EMBODIMENTS OF THE PRESENT INVENTION

Figure 1:
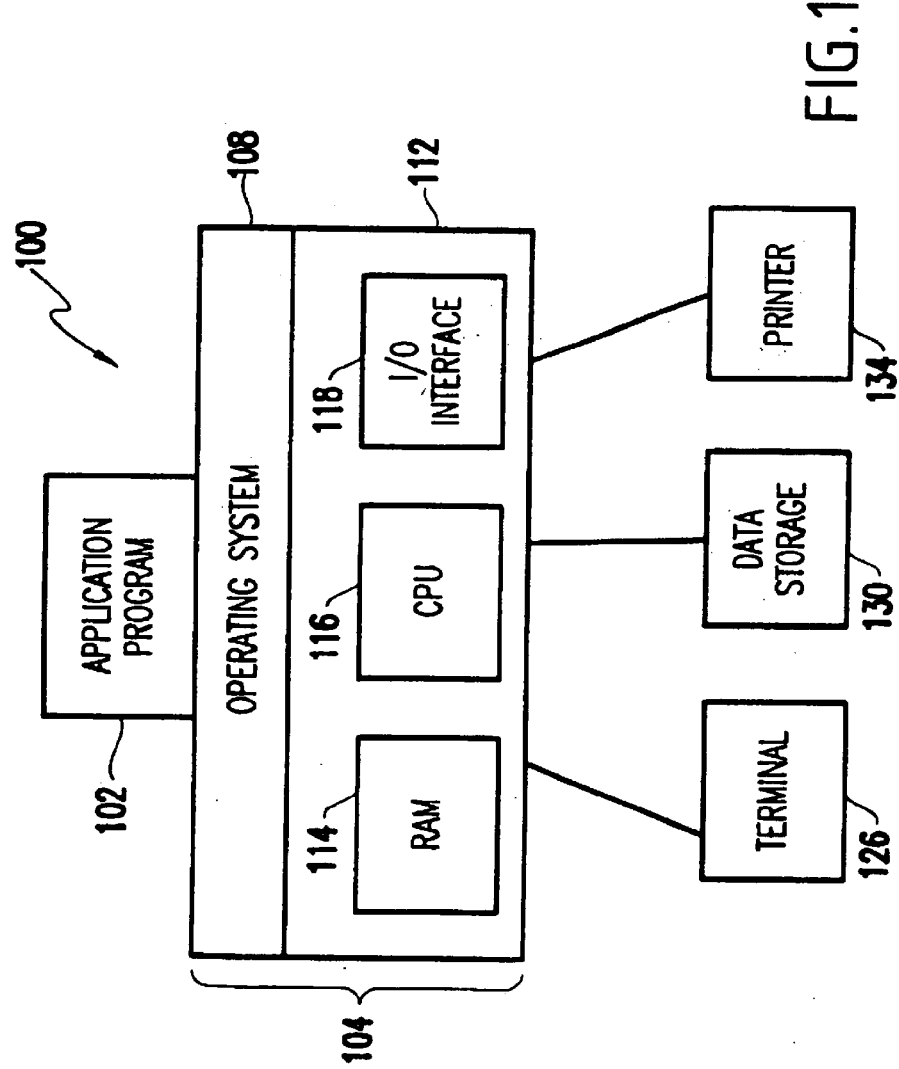
FIG. 1 illustrates an exemplary computer processing system on which the present invention may be implemented.

Referring to FIG. 1, there is shown a block diagram of a computer system 100 on which a preferred embodiment of the present invention operates.

The computer system 100 includes one or more application programs 102 and an operating system 108 that operate on a computer platform 104. The platform 104 includes a hardware unit 112 that includes one or more central processing units (CPUs) 116 (which are typically referred to as CPUs/processors), a random access memory (RAM) 114, and an input/output interface 118.

Various peripheral components may be connected to the computer platform 104 including a terminal 126, a data storage device 130, and a printing device 134. The operating system 108 coordinates the operation of the various components or the computer system 100. An example of computer system 100 is the IBM RISC System/6000 (RISC System6000® is a trademark of the IBM Corporation.) It is readily understood that those skilled in the computer arts will be familiar with many equivalent computer systems 100.

The operating system 108 of the present invention provides multi-threading capabilities wherein multiple concurrent threads of control are dispatched within a single shared address space. Examples include the built-in thread support of operating systems supporting the Java™ Virtual Machine, Microsoft's Windows NT® operating system, and the POSIX threads package that is available on many operating systems, for instance as the pthreads package of IBM's AIX® operating system.

According to the present invention, a software tool and method are provided that operate as an application program 102 on the computer platform of FIG. 1. The software tool provides the deterministic replay of a non-deterministic execution instance of a program. The software tool operates in two modes:

in a record mode, the tool records the logical thread schedule information of the execution while the program runs; and in a replay mode, the tool reproduces the execution behavior of the program by enforcing the recorded logical thread schedule information.

Replaying a multithreaded program involves capturing the thread schedule information during one execution of the program and reproducing the exact same schedule while replaying the execution. A thread schedule of a program is essentially a sequence of time intervals (e.g., time slices). Each interval in this sequence corresponds to the execution of a single thread. Thus, interval boundaries correspond to thread switch points. The thread schedule information obtained from a thread scheduler is referred to as a "physical thread schedule information", and each time interval in a physical thread schedule is referred to as a "physical schedule interval".

As mentioned above, the relative simplicity of the Java programming language and its platform API has made Java attractive as an application development platform. However, certain features of Java, such as multiple threads and network events introduce non-determinism in an application's execution behavior. Non-deterministic execution behavior leads to difficulties in program understanding and debugging. For example, as mentioned above, repeated execution of a program is common while debugging a program. However, non-determinism may result in a bug appearing in one execution instance of the program and not appearing in another execution instance of the same program. Further, the performance can be different from one execution of a program to another execution of the same program.

Providing deterministic replay of application execution is a key step towards programmer productivity and program understanding (e.g., see Anne Dinning and Edith Schonberg, "An empirical comparison of monitoring algorithms for access anomaly detection", *Second ACM SIGPLAN Symposium on Principles and Practice of Parallel Programming*, pages 1–10, Seattle, Wash., March 1990. ACM Press; Thomas J. Leblanc and John M. Mellor-Crummy. "Debugging parallel programs with instant replay", *IEEE Transactions on Computers*, C-36(4):471–481, April 1987; and Mark Russinovich and Bryce Cogswell, "Replay for concurrent non-deterministic shared memory applications", *Proceed-*

*ings of ACM SIGPLAN Conference on Programming Languages and Implementation (PLDI)*, pages 258–266, May 1996). Towards this goal, the present inventors developed a replay framework based on logical thread schedules and logical intervals.

An application of this framework was previously developed in the context of a system called "DejaVu" (e.g., proprietary to IBM Corporation) that provides deterministic replay of multi-threaded Java programs on a single Java Virtual Machine(JVM) (e.g., see Jong-Deok Choi and Harini Srinivasan, "Deterministic replay of java multithreaded applications". *Proceedings of the ACM SIGMETRICS Symposium on Parallel and Distributed Tools*, pages 48–59, August 1998.). In contrast, the present invention describes deterministic replay for distributed Java applications running on multiple JVMs.

The inventive techniques for handling distributed events seamlessly integrate with the earlier work on replay for multi-threaded applications on a single JVM (e.g., see U.S. patent application Ser. No. 08/956,717 having IBM Docket No. Y0997-355). The result of the integration is an efficient deterministic replay tool for multithreaded and distributed Java applications. Such to replay techniques may be implemented for distributed Java applications as extensions to a Java Virtual Machine (JVM), the run-time system on which a Java application will execute. The extended JVM will be referred to hereinunder as "DJVM."

Three major cases are to be considered for a distributed Java application, including, in terms of how much control the distributed system can have over an application: (1) a closed world case, where all the JVMs running the application are DJVMs; (2) an open world case, where only one of the JVMs running the application is a DJVM; and (3) a mixed world case, where some, but not all the JVMs running the application are DJVMs.

For a distributed Java application, DJVM needs to replay execution behavior as defined by Java network communication API. At the core, this API is centered around communication end points called "sockets". Three socket types are supported: 1) a point-to-point stream or TCP socket that supports reliable, streaming delivery of bytes; 2) a point-to-point datagram or packet-based User Datagram Protocol (UDP) socket on which message packets can be lost or received out of order; and 3) a multicast (point-to-multiple-points) socket on which a datagram may be sent to multiple destination sockets. With respect to replay, multicast sockets are just a special case of UDP sockets. Behaviors of TCP and UDP sockets differ and therefore need different solutions for execution replay.

A DJVM runs in two modes: (1) a record mode, wherein, the tool records the logical thread schedule information and the network interaction information of the execution while the Java program runs; and (2) a replay mode, wherein, the tool reproduces the execution behavior of the program by enforcing the recorded logical thread schedule and the network interactions. DJVM uses a portable approach that is independent of the underlying thread scheduler and is believed to be the first tool that completely addresses the issues in handling all the non-deterministic operations in the context of deterministic replay of distributed and multi-threaded Java applications. It is noted that the approach is general and can be applied to distributed and multithreaded applications written in a language with features similar to Java.

Herein below are described, in order, the replay framework and methodology and the application of these concepts for multithreaded Java applications (e.g., more detailed description can be found in the above-mentioned article by Jong-Deok Choi and Harini Srinivasan, "Deterministic replay of Java multithreaded applications", *Proceedings of the ACM SIGMETRICS Symposium on Parallel and Distributed Tools*, pages 48–59, August, 1998), the context for describing distributed replay by providing a general idea on how the framework can be applied for replaying network activity, the replay techniques for closed worlds for TCP and UDP sockets, the techniques for TCP and UDP sockets for open and mixed world cases, and a comparison of the inventive approach to previous approaches.

Replay Framework

Replaying a multithreaded program on a uniprocessor system can be achieved by first capturing the thread schedule information during one execution of the program, and then enforcing the exact same schedule when replaying the execution (e.g., see Mark Russinovich and Bryce Cogswell, "Replay for concurrent non-deterministic shared memory applications", *Proceedings of ACM SIGPLAN Conference on Programming Languages and Implementation (PLDI)*, pages 258–266, May 1996). For purposes of this application, a "uniprocessor" is defined as a computer system with a single central processing unit on which all the user application code is executed.

A thread schedule of a program is a sequence of time intervals (time slices). Each interval in this sequence contains execution events of a single thread. Thus, interval boundaries correspond to thread switch points.

The thread schedule information obtained from a thread scheduler is referred to as the "physical thread schedule information", and each time interval in a physical thread schedule is referred to as a "physical schedule interval". Capturing the physical thread schedule information is not always possible, in particular, with commercial operating systems. Rather than relying on the underlying physical thread scheduler (e.g., either an operating system or a user-level thread scheduler) for physical thread scheduling information, the logical thread schedule information, that can be computed without any help from the thread scheduler, is captured.

To better understand the notion of logical thread schedule, consider a simple multithreaded Java™ program below:

```
class Test {
  static public volatile int f=0; // shared variable
  static public volatile int g=20; // shared variable
  static public void main(String argv[ ]) {
    int j; // local variable
    MyThread t1=new MyThread( );
      t1.start( );
      j=20;
      System.out.println("f ="+f+"j="+j);
    }
}
class MyThread extends Thread {
  public void run( ) {
    int k; // local variable
    k=5;
    Test.f =Test.f+k;
    Test.g=Test.g-k;
  }
}
```

Here, thread main starts a child thread, t1. Both main and t1 can access the (shared) member variables, f and g (e.g., main reads f and t1 reads and writes variables f and g.1). Variables k and j are thread-local variables, while f and g are thread-shared variables. Declaring the shared variables volatile forces each thread not to treat them as thread-local variables in the absence of any explicit synchronization operations. The term "variable" denotes the unique memory location associated with the variable at an execution point.

FIGS. 2(a) and 2(b) depicts some execution instances (e.g., physical thread schedules) of the example program on a uniprocessor machine. It is noted that time is marked in the vertical direction. The only difference between the execution instances as shown in FIGS. 2(a) and 2(b) is the time when variable j is updated. This does not affect the execution behavior of the program because accessing a local variable is a local event of a thread.

That is, in FIG. 2(a), the shared variable foo is incremented by t1 before the thread main can print the value of foo. Hence, for this execution, the value printed is 5. The difference, between the execution instance in FIGS. 2(a) and 2(b) is that in the latter case, variable j is updated before thread t1 starts executing. The value of foo that gets printed is 0.

The value off printed by thread main is still 5. However, in both execution instances (e.g., FIGS. 2(c) and 2(d)), main prints the value 0 off before t1 updates it. Hence, the value printed is 0. Likewise, the value of foo that gets printed is 0. Again, the only difference between the thread schedules 2(c) and 2(d) lies in the order of local variable accesses. That is, in FIG. 2(c), k is updated before the saved variable foo is accessed by thread main and in FIG. 2(d) k is updated after foo is accessed in main.

Thus, an execution behavior of a thread schedule can be different from that of another thread schedule, if the order of shared variable accesses is different in the two thread schedules. Hence, it is possible to classify physical thread schedules with the same order of shared variable accesses into equivalence classes. In the above example, schedules of FIGS. 2(a) and 2(b) belong to the same equivalence class. Likewise, schedules of FIGS. 2(c) and 2(d) belong to one equivalence class. All of the physical thread schedules in an equivalence class are referred to as "a logical thread schedule".

Synchronization events can potentially affect the order of shared variable accesses, and thus affect the possible logical thread schedules. Examples of such synchronization operations in Java™ are synchronized methods/blocks and wait. For example, a Java™ Virtual Machine provides several different kinds of synchronization:

monitorenter, monitorexit are instructions that mark the beginning and end respectively of a critical section. The semantics of a critical section is that only one thread can execute the section of code at any given time. A different thread can enter the critical section only after the first has executed the monitorexit operation. However, threads compete to enter a critical section, and during different execution instances, threads may acquire access to the critical section in different orders. Synchronized methods and blocks can be implemented using the monitorenter and monitorexit instructions.

wait, notify, notify All are instructions that can be used to coordinate the execution order of multiple threads. A thread that has executed a wait operation on an object must wait to be notified by a different thread executing a notify operation on the same object. The thread that executes the notify operation on an object wakes up an arbitrary thread waiting on the same object. The notify All operation can be used to wake up all the corresponding waiting threads.

suspend and resume are instructions used to coordinate the execution order. A thread can execute a suspend operation that suspends the execution of another thread or itself. The suspended threads must be explicitly resumed by another thread executing the resume operation.

Finally, it is possible for a thread to execute an interrupt operation that interrupts the execution of a thread at any point.

All of the above-mentioned synchronization operations affect the execution order of threads, which in turn can affect the order of shared variable accesses and hence the physical thread schedules.

The events, such as shared variable accesses and synchronization events, whose execution order can affect the execution behavior of the application, are referred to as "critical events". A logical thread schedule is a sequence of intervals of critical events, wherein each interval corresponds to the critical and non-critical events executing consecutively in a specific thread.

In addition, the interactions between synchronization operations in the user application are themselves part of the application and have to be reproduced for the user to correctly understand their program behavior. It is therefore important, in a record/replay tool, to capture all of these synchronization events and the shared variable accesses in order to reproduce the exact same execution behavior of the program. Synchronization events and shared variable accesses of a thread are collectively referred to below as "critical events".

It is possible to classify physical thread schedules with the same execution behavior into equivalence classes. More specifically, let s1 and s2 be two physical thread schedules for the same program execution with the same inputs. Let t1, t2, . . . , tn be threads executing in schedules s1 and s2. Schedules s1 and s2 are equivalent if the critical events and their order are the same in s1 and s2. ID the example presented above, the schedules shown in FIGS. 2(a) and 2(b) belong to the same equivalence class. Likewise, the schedules shown in FIGS. 2(c) and 2(d) belong to one equivalence class.

The software tool of the present invention preferably refers to all the physical thread schedules belonging to an equivalence class as a logical thread schedule. Thus, if physical schedules s1 and s2 are equivalent, they correspond to the same logical thread schedule. More specifically, a logical thread schedule is a sequence of intervals of critical events, wherein each interval corresponds to the critical events executing in a specific thread. Preferably, a given interval satisfies the following properties:

1. all critical events of the interval belong to the same thread;

2. all critical events of the interval are consecutive;

3. only non-critical events can occur between consecutive critical events in the interval; in other words, given any two critical events c1 and c2 of an interval, all critical events of the thread between c1 and c2 also belong to this interval; and 4. no two adjacent intervals belong to the same thread.

It is noted that it is not necessary to trace each critical event individually. More specifically, for a particular logical schedule, if multiple critical events always occur in succession and are not separated by a thread switch, then it suffices to trace the critical event interval (e.g., the first critical event and the last critical event). Tracing the critical event interval rather than every critical event reduces the space requirements for the traces, and consequently improves the performance of the replay tool.

For example, in FIGS. 2(a)–2(d), in both the logical schedules, the shared variables foo and bar are accessed in thread t1, uninterrupted by thread switches, in the order foo; bar; foo. Rather than trace each of these critical events, the first access to foo and the last access to foo in t1 can be traced. Before proceeding to discussing record and replay of critical events, formalizing the notion of logical thread schedule and how such schedules can be captured will be described.

The data representing the logical thread schedule of a program execution preferably includes a set of thread-specific logical schedules each corresponding to a thread created during the execution as follows:

logical_thread_schedule_for_execution=
 {thread_specific_logical_schedule[1], . . . ,
 thread_specific_logical_schedule[i], . . . ,
 thread_specific_logical_schedule[number_of_
  threads]}.

The thread-specific logical schedule of a thread includes a list of logical schedule intervals (LSIS) each corresponding to an interval during which the specific thread is scheduled for execution as follows:

thread_specific_logical_schedule[i]={LSI[O], . . . , LSI [j], . . . LSI[last-1]}

The list is preferably implemented as a linked list during the record phase, when the number of logical schedule intervals is not known a priori. It is preferably implemented as an array during the replay phase, when the number is known a priori.

The logical schedule interval corresponding to an interval i when the specific thread is scheduled for execution, denoted LSI[i], identifies the critical event(s) that occur in the given interval i. Preferably, LSI[i] is an ordered pair <FirstCriticalEvent[i], LastCriticalEvent[i]>wherein FirstCrticalEvent[i] identifies the first critical event in the interval i and LastCriticalEvent[i] identifies the last critical event in the interval i. Preferably, the value of FirstCriticalEvent[i] and LastCiticalEvent[i] represent a global clock value that indicates the time that the corresponding event was executed. Such global clock values identify the ordering of events in the execution stream.

Figure 3A:
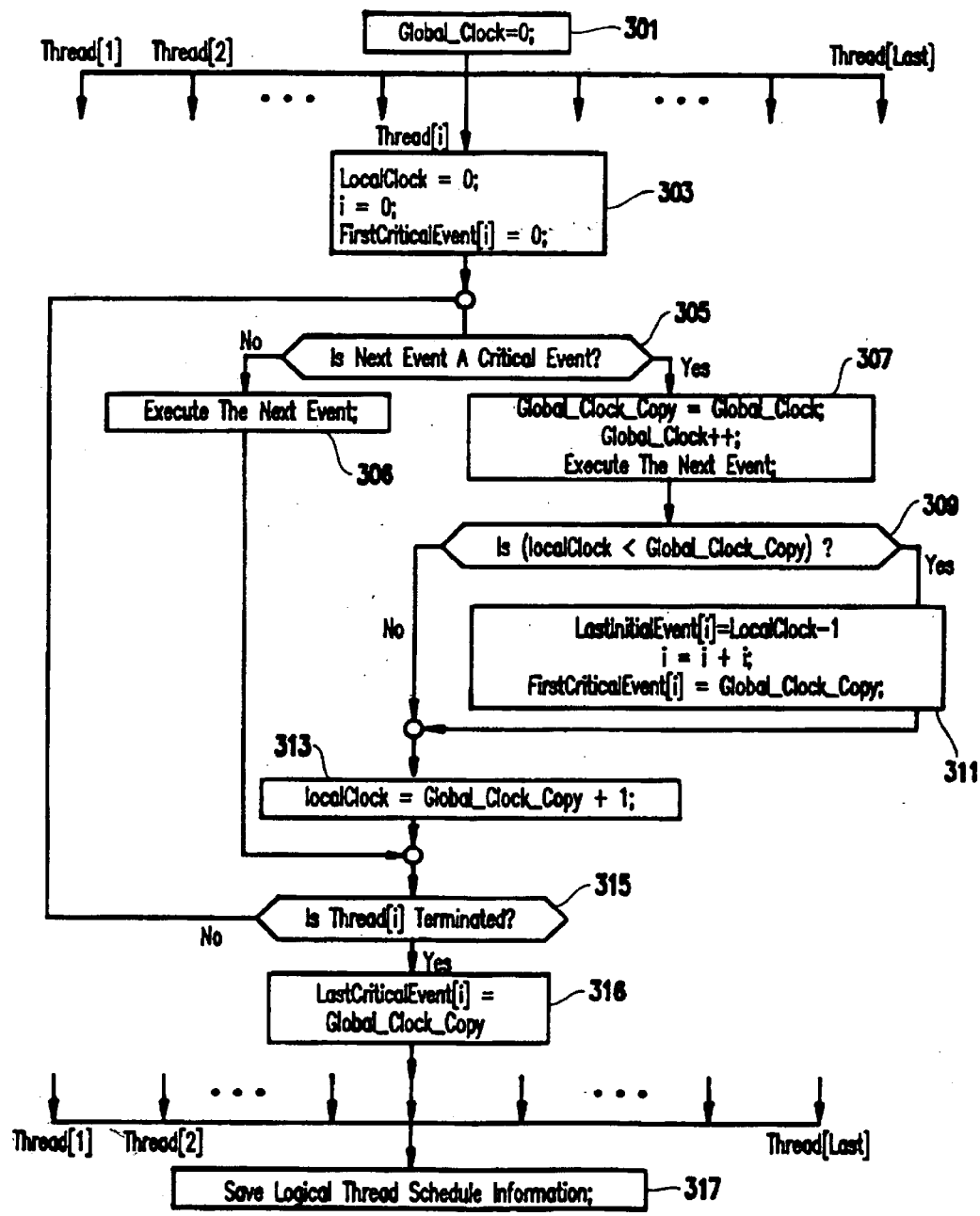
FIG. 3A illustrates a flow chart of the software tool of the invention for capturing a logical thread schedule.
Figure 4:
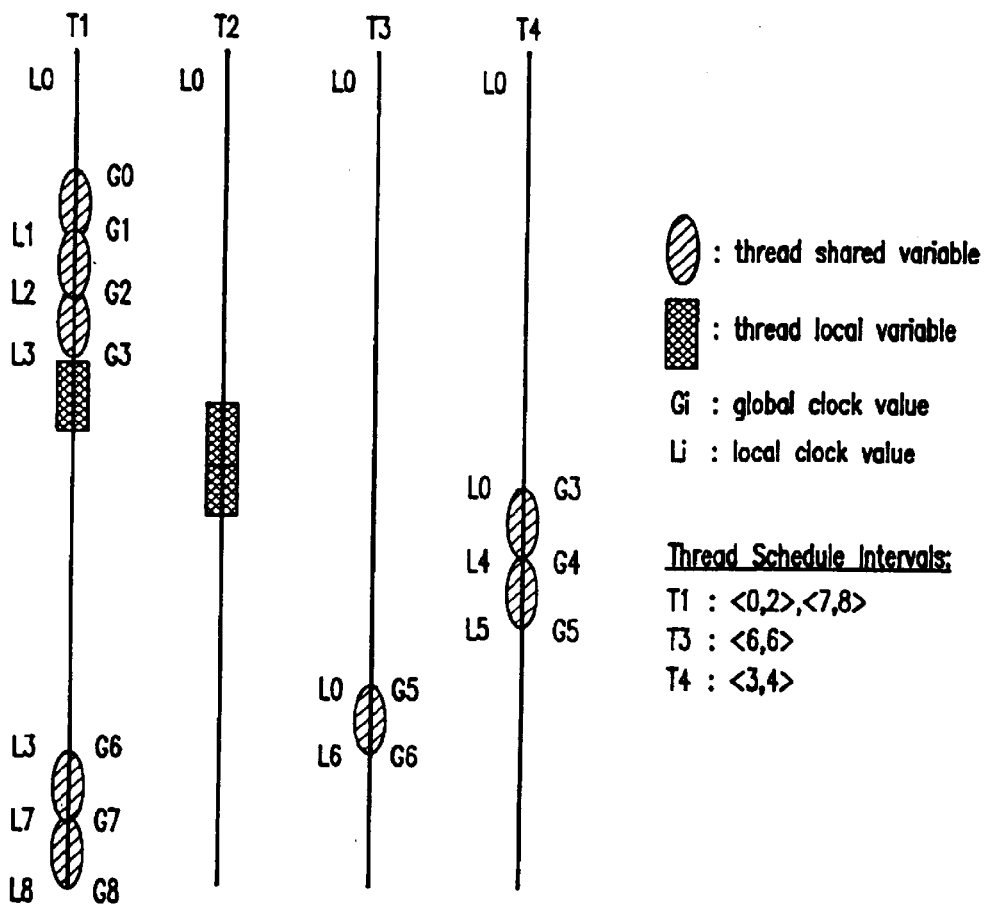
FIG. 4 illustrates exemplary logical thread schedules and how they are identified.

The logical thread schedule of the present invention as described above preferably is generated using a global counter and a local counter. An example of the operations in capturing the logical thread schedule is illustrated in FIG. 3A Exemplary logical thread schedules and how they are identified is illustrated in FIG. 4.

Logical Thread Schedule Intervals

The logical thread schedule of an execution instance on a uniprocessor system is an; ordered set of critical event intervals, called "logical schedule intervals". Each logical schedule interval, LSIi, is a set of maximally consecutive critical events of a thread, and can be represented by its first and last critical events as: LSI i=<FirstCEventi; LastCEventi>.

The approach to capturing logical thread schedule information is based on a global counter (i.e., time stamp) shared by all the threads and one local counter exclusively accessed by each thread (e.g., one local counter being provided for each thread). The global counter ticks (e.g., increments) at each execution of a critical event to uniquely identify each critical event. Therefore, FirstCEventi and LastCEventi can be represented by their corresponding global counter values. It is noted that the global counter is global within a particular DJVM, not across the network (over multiple DJVMS). Thus, each DJVM includes a different global counter. A local counter also ticks at each execution of a critical event. The difference between the global counter and a thread's local counter is used to identify the logical schedule interval on-the-fly.

The general idea of identifying and logging schedule interval information, and not logging the exhaustive information on each critical event is important for the efficiency of the W inventive replay mechanism. In the log file generated by the system, the present inventors have found it typical for a schedule interval to include thousands of critical events, all of which can be efficiently encoded by two, not thousands of counter values.

There are many programs and methods for generating a logical thread schedule including that shown in FIG. 3A. It is note that the "global clock" and "global counter" are synonymous That is, an example of the operations in capturing the logical thread schedule is illustrated in FIG. 3A. The operations begin in step 301 by initializing the variable GLOBAL_CLOCK to 0. GLOBAL_CLOCK is shared by all threads generated by the physical thread scheduler during the execution of the program. Such threads are denoted as thread[1] through thread[last]. The physical thread scheduler creates such threads in a serial fashion. The software tool of the present invention deterministically assigns a thread identifier to the newly created thread and passes the thread identifier to the newly created thread. The thread identifier is initialized to 0 and incremented automatically for each thread created. For each thread, a thread-specific logical thread schedule is computed (steps 303 through 315). The figure shows the steps for thread[i] in detail as a representative case.

In step 303, a variable localClock is initialized to 0 and the first logical schedule interval of the thread is created with the initial GLOBAL_CLOCK (0) as its first critical event. Steps 305–315 form a loop that terminates when the thread terminates. For each instruction to be executed in the thread (i.e., the next event), in step 305 it is determined whether the instruction is a critical event. If not, control branches to step 306 wherein the instruction is executed and the operation continues to step 315. Upon execution of the instruction, the processing system, identifies the next instruction in the execution sequence. If in step 305 it is determined that the instruction is a critical event, then operation continues to step 307 wherein an atomic operation is performed that executes the critical event, makes a copy GLOBAL_CLOCK_COPY of the current value of GLOBAL_CLOCK and updates GLOBAL_CLOCK. An example of the atomic operation is described below with respect to FIG. 5. In this example, the GCCriticalSection represents such atomic operation. Upon execution of the instruction, the processing system identifies the next instruction in the execution sequence. After step 307, operation continues to step 309.

In step 309, it is determined whether there is a gap between GLOBAL_CLOCK_COPY and localClock. The value of GLOBAL_CLOCK, which is reflected in GLOBAL_CLOCK_COPY, can be updated by all the threads; yet localClock can only be updated by the thread that owns it. Therefore, localClock cannot be greater than GLOBAL_CLOCK_COPY. If localClock is equal to GLOBAL_CLOCK_COPY, a thread switch has not occurred between the last event and the current event, and the operation continues to step 313. If localClock is less than GLOBAL_CLOCK_COPY, a thread switch has occurred between the last event and the current event, and the operation continues to step 311 wherein the current logical schedule interval LSI[i] is completed with the value (localClock-1) as its LastCriticalEvent[i], the counter i is incremented, and a new logical schedule is created with GLOBAL_CLOCK_COPY as its FirstCriticalEvent[i]. In step 311, all threads other than the main thread have an initial interval <0, −1>, which is ignored.

After step 311, the operation continues to step 313 wherein GLOBAL_CLOCK_COPY is incremented and localClock is updated to the incremented value of GLOBAL_CLOCK_COPY. In step 315, it is determined if the current event is the last event of the thread. If not, the operation returns to step 305 and steps 305 to 315 are repeated, If so, the operation continues to step 316 wherein the last logical schedule interval LSI[i] of the a terminating thread is completed with the value GLOBAL_CLOCK_COPY as its LastCriticalEvent[i].

Finally, after all the threads have terminated, in step 317, the logical thread schedule information for all the threads is saved in a file.

FIG. 4 illustrates logical schedule intervals for an exemplary program execution. FIG. 4 shows the execution of four threads (e.g., with time going down along the vertical lines) and local and global counter updates at shared variable accesses in each of the threads.

Identifying and Replaying Logical Schedule Intervals

Figure 5:
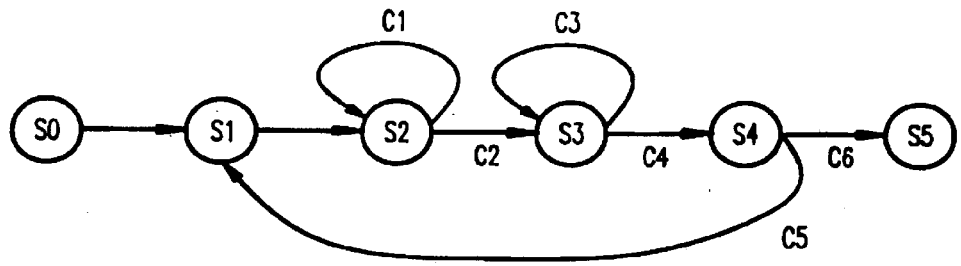
FIG. 5 illustrates a state diagram that illustrates the operation of the software tool of the present invention in replay mode and specifically a replay finite state automation.

Referring to FIG. 5, which illustrates a replay finite state automation process and the process of identifying and replaying logical schedule intervals, will be described.

Thus, each critical event is uniquely associated with a global counter value. Global counter values in turn determine the order of critical events. Therefore, updating the global counter for a critical event and executing the critical event, are performed in one atomic operation for shared-variable accesses. Some synchronization events are handled differently to avoid deadlocks (e.g., for a detailed description, see the above-mentioned Jong-Deok Choi and Harini Srinivasan, "Deterministic replay of java multi-threaded applications", *Proceedings of the ACM SIGMETRICS Synosium on Parallel and Distributed Tools*, pages 48–59, August, 1998), the present inventors have implemented light-weight GC-critical section (e.g., Global Counter critical section) codes to implement a single atomic action of critical events by guarding them with GcEnterCriticalSection and GcLeaveCriticalSection, as shown in steps 301–305 of FIG. 3B. It is used when the critical event is a general event (e.g., a shared variable access). GcEnterCriticalSection and GcLeaveCriticalSection are implemented by acquiring and releasing a light-weight lock (e.g., an "efficient," lock, which does not incur much runtime overhead) called GCounter_Lock. Synchronization events with blocking semantics, such as monitorenter and wait, can cause deadlocks if they cannot proceed in a GC-critical section. Therefore, the invention handles these events differently by executing them outside a GC-critical section (e.g., for a detailed description, see the above-mentioned Jong-Deok Choi and Haini Srinivasan, "Deterministic replay of java multithreaded applications", *Proceedings of the ACM SIGMETRICS Svmposium on Parallel and Distributed Tools*, pages 48–59, August, 1998).

Figure 3B:
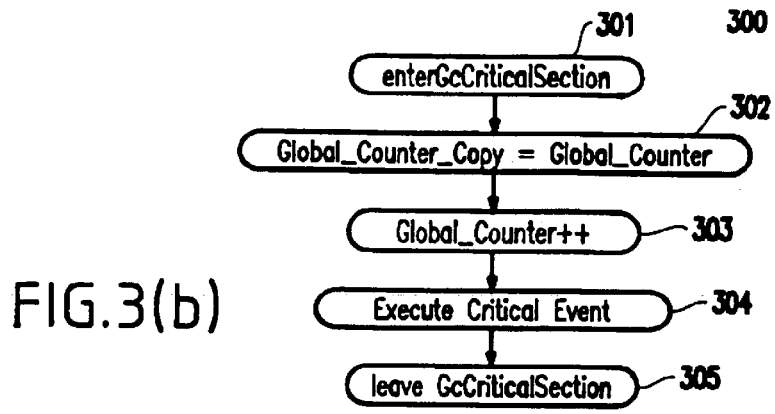
FIG. 3B illustrates a general critical (GC)-critical section 300 for general critical events.

Updating the global counter and executing the event both in one single atomic operation is only needed during the record phase (e.g., as shown in FIG. 3(B)). For a thread to execute a schedule interval LSI i=<FirstCEventi; LastCEventi>, during the replay phase, the thread waits until the global counter value becomes the same as FirstCEventi without executing any critical events. When the global counter value equals FirstCEventi, the thread executes each critical event and also increments the global counter value until the value becomes the same as LastCEventi.

When the global counter value equals LastCEventi, the thread fetches its next schedule interval, LSI i+1= <FirstCEventi+1; LastCEventi+1>, from the log and waits until the global counter value becomes the same as FirstCEventi+1. Then, it repeats the above process until it has no more schedule intervals in the log. FIG. 5 shows the automaton that each thread executes to reproduce the same execution behavior.

Distributed DJVM

Hereinbelow is described a general idea of how the framework can be applied to DJVM in an extensible manner to handle both multi-threaded and distributed Java applications, in closed, open and mixed world environments.

In each of these environments, Deterministic replay of the distributed Java application is ensured by identifying network events as "critical events" (e.g., details for each network event are described below). These network events can potentially change the observable execution behavior of the distributed Java application.

Execution order of critical events up to the first network event will be preserved by the DJVM even without the support for network events. The support in DJVM for network events ensures that the network events happen in the same execution order as in the record mode. With network support in DJVM, it can be concluded by induction that DJVM can deterministic ally replay all critical events, network or non-network. Hereinbelow is described the different solutions in DJVM for replay of network events.

The "closed world" case is by far the more complex case. The replay techniques for TCP and UDP sockets in this world is described immediately below. Then, an overview is provided as to how replay can be supported for both stream and datagram sockets in open and mixed worlds.

Closed World Case

Replay for TCP sockets is described first, followed by that for UDP sockets.

First, regarding supporting stream sockets, the Java APIs (e.g., see Patrick Chan and Rosanna Lee, "The Java Class Libraries, An Annotated Reference", Addison Wesley Publication, 1997) for stream sockets will be described followed by issues in replaying distributed applications that use stream sockets, and the inventive techniques for recording and replaying for deterministic replay.

Stream sockets are created by Socket and ServerSocket classes in Java. A client constructs a Socket object to connect to a server. In the process of executing the Socket( ) constructor, the client will execute the connect( ) call. The construction is blocked until a connection is established by a server. A server constructs a ServerSocket object to specify the port to listen on. It then invokes the accepts method of the object to accept a connection request. The accept( ) blocks until a connection is established. It then creates and returns a Socket object. The server can close the socket connection via close( ) method of the ServerSocket object.

Once a socket is created, getInputstream( ) and getOutputStream( ) of the Socket object return InputStream and OutputStream objects to be used for reading (via read) method call) and writing (via write( ) method call) stream data over the socket stream.

Other socket APIs include a method to listen for connections on a stream socket (listen( )), method to bind a socket to a local port (bind( )), and a method to determine the number of bytes that can be read without blocking (available( )).

There are several key issues which must be considered in deterministic replay of stream socket events. Each stream socket call (e.g., accept, bind, create, listen, connect, close, available, read, write) is mapped into a native method call (i.e., a call to a non-Java method, possibly an operating system call) in a JVM implementation. Each of these native calls is referred to as "a network event". For convenience, hereinbelow, the names of the Java calls, for the corresponding native calls will be used when referring to the critical events. For replaying stream socket network events, the following issues are relevant.

Variable network delays: Since network delays can vary for different executions of the same distributed Java application, socket connections can be non-deterministic. Therefore, the first step for deterministic replay of network events is deterministic reestablishment of socket connections among threads. The relevant socket calls that are affected by this issue are accepts and connect( ).

Figure 6:
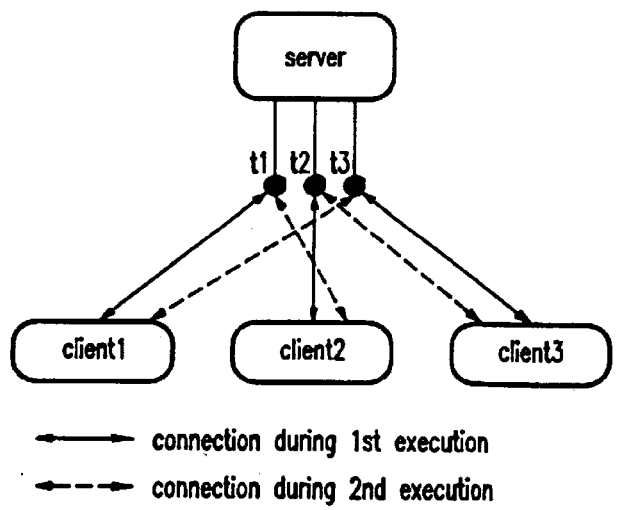
FIG. 6 illustrates a server and three clients showing connections during first and second executions, and specifically a network-delays problem.

FIG. 6 illustrates the above issue with an example. The server application in FIG. 6 has three threads t1, t2, t3 waiting to accept connections from clients (e.g., this would be a typical scenario in distributed Java applications). Client1, Client2 and Client3 execute the connect( ) call, making connection requests to the server. The solid and dashed arrows indicate the connections between the server threads and the clients during two different executions of the distributed Java application.

Variable message sizes: The stream-oriented nature of the connections can result in variable length messages read by the receiver of the messages. In other words, the reads method calls can return less than or equal to the number of bytes requested. A simple re-execution of the reads method during the replay phase can result in a different number of bytes being read than the number read in the record phase.

Network queries: Operations related to the status and attributes of a connection need to be replayed. For instance, if the particular port number was allocated to a socket during the record phase, the application should see the same port number during the replay phase. The relevant socket calls affected by this issue are available( ) and bind( ).

Blocking calls: Socket calls such as accept( ), connect( ), read( ) and available( ) are blocking calls. Hence, if these calls are placed within the GC-critical section, they can cause the entire DJVM to be blocked until the call completes, and can result in deadlocks and inefficient and heavily perturbed execution behavior.

The invention also provides a record and replay mechanism for stream sockets. That is, each DJVM is assigned a unique JVM identity (DJVM-id) during the record phase. This identity is logged in the record phase and reused in the replay phase. The DJVM-id allows identification of the sender of a message or connection request.

A network event on a DJVM is identified by a networkEventId defined as the tuple <threadNum, eventNum>, where threadNum is the thread number of the specific thread executing the network event and eventNum is a number that identifies the network event within that thread. The eventNum is used to order network events within a specific thread.

In addition, the connectionId is used to identify a connection request at a connect network event. The connectionId is the tuple, <dJVMId, threadNum>, where dJVMId is the identity of the DJVM at which the connect event is being generated, and threadNum is the thread number of the client thread generating the connection request.

Since threads are created in the same order in the record and replay phases, the inventive implementation guarantees that a thread has the same threadNum value in both the record and replay phases. In addition, since events are sequentially ordered within a thread, the eventNum of a particular network event executed by a particular thread is guaranteed to be the same in the record and replay phases.

The inventive techniques for record and replay phases that handle the above-mentioned issues, are described below.

Replaying accept and connect: Since these calls are a source of non-determinism, these are made DJVM critical events. Although this guarantees the execution order within a DJVM, it alone is not sufficient for correctness because of non-determinism introduced by network delays. So additional data regarding the connection is stored at the server DJVM. Further, as mentioned earlier, these calls are blocking calls and executing these calls within a GC-critical section reduces application parallelism and introduces potential for deadlocks. Therefore, the operating system level network operations are allowed to proceed and then mark the network operations as critical events. This marking strategy allows threads performing operations on different sockets to proceed in parallel with minimal perturbation.

In the record phase, at the connect, DJVM-client sends the socket-connection request to the server, possibly accepted by a peer thread on the server. When the socket connection is finally established, the client thread on DJVM-client sends the connectionId for the connect over the established socket as the first data (meta data). Note that the connectionId is sent to the server via a low level (native) socket write call and is done before returning from the Socket( ) constructor call. This ensures that the connectionId is indeed the first data sent over this connection. Finally, just before the connect call returns, DJVM-client performs the GC-critical section for atomically updating the global counter.

In the replay phase, DJVM-client executes the connect and sends the connectionId of the connect to the server as the first meta data, just as in the record phase. Since connect is a critical event, DJVM-client ensures that the connect call returns only when the globalCounter for this critical event is reached.

On the server side, during the record phase, at an accept, the DJVM-server accepts the connection and receives the connectionId sent by the client as the first meta data at the corresponding connect. The DJVM-server also logs the information about the connection established into the NetworkLogFile. For each successful accept call, the log contains an entry, called a ServerSocketEntry, which is the tuple, <serverId, clientId >, where serverId is the networkEventId of the corresponding accept event and clientId is the connectionId sent by the DJVM-client.

Given the information stored in a tuple, it is possible for two different threads to have identical ServerSocketEntry tuples in their part of the NetworkLogFile. However, this lack of unique entries is not a problem. The core, single DJVM ensures the replay of invocation order (not completion) of accepts across threads since accept is a synchronized call. Thus for example, if during record phase, a thread t1 invoked the accept method on a socket before thread t2, the thread t1 will invoke the accept method before t2 during replay. Since the client threads also execute their connects in the original order, the connection gets re-established between the same two threads as during original execution. Further, an exception thrown by a network event in the record phase is logged and re-thrown in the replay phase.

Figure 10:
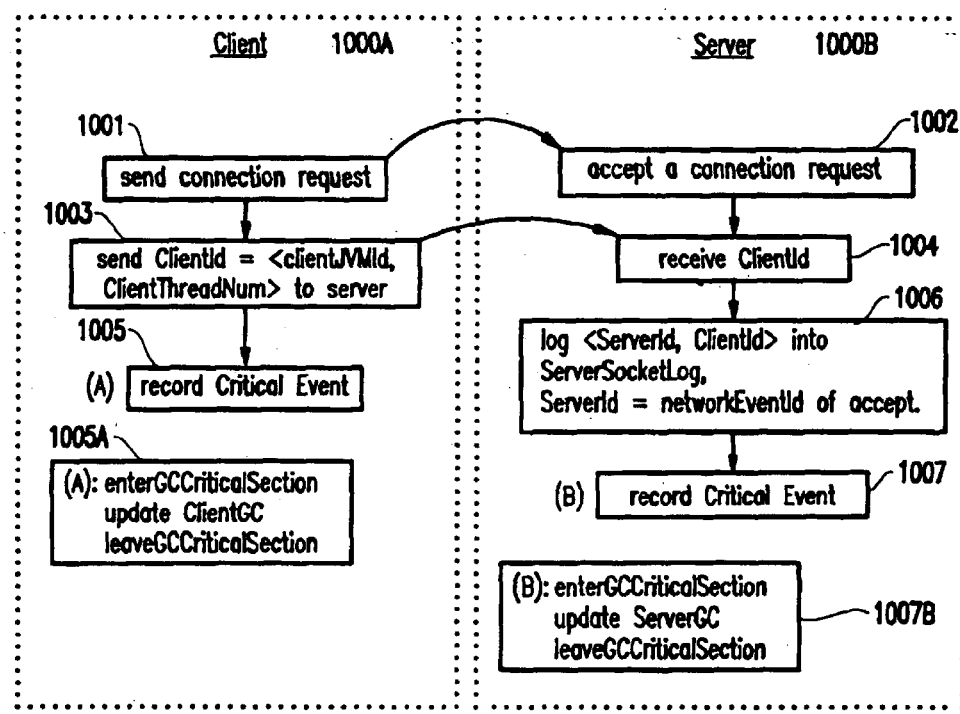
FIG. 10 illustrates an "accept-and-connect" process in a record mode for a client and server configuration.

FIG. 10 shows the process 1000 (code) executed during the record phases by both, the client (e.g., that does the connect) and server (e.g., that does the accept).

That is, on the client side 1000A of FIG. 10, a first step 1001 the connection request is sent to the server side 1000B (e.g., step 1002 on server side). Then in step 1003 on the client side, the ClientID (connectionId) in the form of a tuple, <clientJVMId, ClientThreadNum> is sent to the server 1000B.

In step 1004 on the server side, the ClientID is received and the server side logs <ServerId, ClientID> into the ServerSocketLog (step 1006).

In step 1005 on the client side, a step of record critical event occurs. This step includes steps 1005A of enterGCCriticalSection, update ClientGC, and leaveGCCriticalSection. It is noted that step 1007 and step 1007B on the server side is substantially similar to that of steps 1005 and 1105A on the client side (e.g., step 1007 is performed when: the server encounters a critical event on its side.

To replay accept events, a DJVM maintains a data structure called connection pool to buffer out-of-order connections. During the replay phase, when an accept is executed by a server thread ts on DJVM-server, it first identifies the networkEventId for this accept event, i.e., <threadNumofts; eventNumofAcceptWithints>. It then identifies the connectionId from the NetworkLogFile with matching networkEventId value. DJVM-server then checks the to connection pool to see if a Socket object has already been created with the matching connectionId.

If the Socket object has been created, it simply returns the Socket object to complete the accept. If a Socket object has not already been created with the matching connectionId, the DJVM-server continues to buffer information about out-of-order connections in the connection pool until it receives a connection request with matching connectionId. It then creates and returns a Socket object for the matching connection.

FIG. 11 shows the code (e.g., accept process 100 in replay mode) for accept (e.g., on the server side) during the replay mode. The code for connect during the replay mode is the same as the corresponding code in the record mode, except, in step 1005A, the ClientGC is not updated.

In step 1102, the ClientID which equals recValue is retrieved from the ServerSocketLog for this Server networkeventId (ServerId).

Then in step 1103, the connection pool is checked for the recValue. If the recValue is in the connection pool, then the process exits. If the recValue is not in the connection pool, then the process continues to step 1104. In step 1104, a connection request is accepted. Thereafter, in step 1105, the ClientId is received by the server.

In step 1106, it is determined whether ClientId is not equal to the recValue. If so (e.g., not equal), then the ClientId is saved in the connection pool, and the process loops to step 1104. Conversely if in step 1106 it is determined that the ClientId is equal to the recValue, then the process goes to step 1107 (which is substantially similar to 1000B described above). Finally, after step 1107, the process exits in step 1108.

Figure 7:
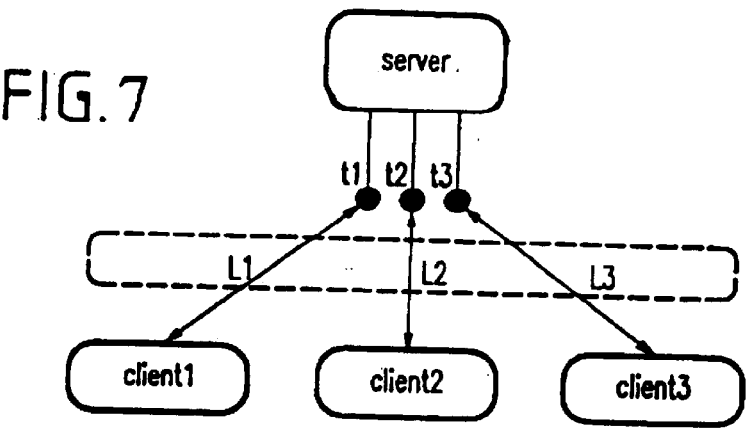
FIG. 7 illustrates a server and three clients, and specifically a mechanism for deterministic replay of connections.

For the example in FIG. 6, suppose the solid arrows indicate the connections established during the record phase. FIG. 7 shows the inventive mechanism for deterministically replaying the same connections. L1, L2, L3 are the log entries made during the accept events by threads t1, t2, t3 respectively during the record phase. Server1Id, Server2Id, Server3Id are the networkEventId values when t1, t2, t3 respectively execute the accept events.

FIG. 7 also shows the connectionIds sent by each client. For example, the connectionId from Client2 is Client2Id =<Client2VMId; tNum2>.

Replaying read: Socket read event is identified as a critical event in a DJVM. Since the number of bytes read via a socket read can vary for different executions, in the record phase, the DJVM executes the read and logs the thread-specific eventNum and number of bytes read (numRecorded) in the NetworkLogFile. Since read is a blocking call, it is not placed within a GC-critical section. Instead, just before the read call returns, the DJVM marks the read as a critical event. In the replay phase, at the corresponding read event, the DJVM thread retrieves the numRecorded number of bytes from the NetworkLogFile corresponding to the current eventNum. Further, the thread reads only numRecorded bytes even if more bytes are available to read or will block until numRecorded bytes are available to read. Finally, the execution returns from the read call only when the globalCounter for this critical event is reached.

Figure 8A:
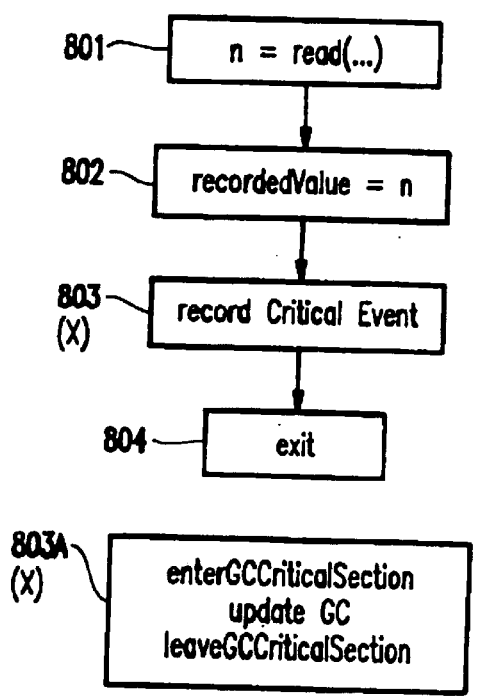

FIG. 8(*a*) shows the process during the record mode for read ( ). In step 801, the read event is executed, returning "n", the number of bytes read which is logged in recordedValue in step 802. The critical event corresponding to the read is logged in step 803 and the process exits in step 804. Step 803 is essentially 803A which involves entering the GC critical section, updating the global counter and leaving the GC critical section.

FIG. 8(*b*) shows the process during the replay mode for read( ). In step 852, the read critical event is executed returning the number of bytes read, "n", issuing recordedValue as: parameter (indicating the number of bytes that should be read). In step 853, it is determined when n<recorded value. If "YES", the process continues to step 855. If n is equal to the recordedValue (e.g., "NO" in step 853), the process records the read critical event (step 856) and exits (step 857). If n is less than the recordedValue, process goes back to step 852, reading bytes until the recordedValue number of bytes are read. Step 856 is essentially step 856A which involves waiting for the GC value to be that recorded for this read in the record Mode and the updating the global counter.

Replaying write: write is a non-blocking call and a critical event. write is handled by simply placing it within GC-critical section similar to how we handle critical events corresponding to shared variable updates. FIGS. 9(*a*) and 9(*b*) show the record and replay code respectively for write( ).

In step 901*a*, the process enters the GC-critical section. In step 902*a*, in the record mode, the process updates the GC and executes the write( ) event Finally, step 903*a* involves exiting the GC critical section.

In the replay mode, step 901*b*, waits until the global counter value equals the recorded global counter value for this write event. Step 902*b* executes the write event and step 903*b* updates the global counter.

Since SocketInputStream.read and SocketOutputStream.write are not synchronized calls, multiple writes on the same socket may overlap. If the order of writes overlap, the order: of critical events is potentially lost. While replaying the writes and the corresponding reads, we have to ensure that all the writes to the same socket happen in the same order and all the reads (from the socket) read the bytes in the same order in both the record and replay modes.

A solution is to just record the occurrence of such an event and allow other unrelated events (i.e., events that do not operate on the same socket) to proceed. Events that do use the same socket will be blocked by using a lock variable for each socket. This is shown in FIGS. 12(*a*) and 12(*b*) respectively. That is, steps 1201–1204 in FIGS. 12(*a*) and steps 1251–1254 of FIG. 12(*b*) respectively illustrate an exemplary steps for implementing a more efficient record and replay code of a read and a record and replay code for a write. The enterFDCriticalSection(socket) in step 1201 (1251) of FIGS. 12(*a*) and 12(*b*) ensures that only reads or writes corresponding to that socket execute the code inside.

This scheme allows some parallelism in the record and replay modes and also preserves the execution ordering of the different critical events. The additional cost in this scheme is the cost of the extra lock variables per socket and the slightly increased implementation complexity.

Replaying available and bind: The available and bind events are also treated as critical events. Both these events implement network query. In the case of available, it checks the number of bytes available on the stream socket, and bind returns the local port to which the socket is bound.

Since available is a blocking call, in the record phase, it is executed before the GC-critical section. In addition, the DJVM records the actual number of bytes available. In the replay phase, the available event can potentially block until it returns the recorded number of bytes, i.e., until the recorded number of bytes are available on the stream socket.

In the case of bind, in the record phase, it is executed within a GC-critical section and the DJVM records its return value. In the replay phase, we execute the bind event, passing the recorded local port as argument.

Other stream socket events: The other stream socket events that are marked "critical events" are create, close, and listen, all of which have to be recorded to preserve execution order. These critical events are handled by simply enclosing them within the GC-critical section, similar to how critical events corresponding to shared variable updates, are handled.

Supporting Datagrams Sockets

TCP socket is designed to be reliable. If data is lost or damaged during transmission, TCP ensures that the data is sent again. If data or packets arrive out of order, TCP rearranges them to be in the correct order. User Datagram Protocol (UDP) is an alternative protocol to send data over the network, and is unreliable. The packets, called datagrams, can arrive out of order, duplicated, or some may not arrive at all. It is the JAVA application's responsibility to manage the additional complexity.

For deterministic replay of applications using UDP, DJVM must ensure the same packet delivery behavior during the replay as during the record phase. In other words, the replay mechanism must ensure that the packet duplication, packet loss and packet delivery order in the to record phase is preserved in the replay phase. Hereinbelow is described how to achieve this replay for Datagram (UDP) sockets, and how multicast sockets can be easily accommodated by extending the mechanism for Datagram sockets from a point-to-single-point scheme to a point-to-multiple-points scheme. In Java, there exist Datagram socket APIs, and UDP sockets are created via the DatagramSocket class (e.g., see Patrick Chan and Rosanna Lee, "The Java Class Libraries, An Annotated Reference", Addison Wesley Publication, 1997). A DatagramPacket object is the datagram to be sent or received through the DatagramSocket object via send( ) and receive( ) methods of the DatagramSocket object. The send( ) and receive(are both blocking calls.

A datagram socket is closed via close) method of the socket object. As in the case of stream sockets, each of the datagram socket calls can be implemented in a JVM via a low-level native call. The names of the UDP socket calls are used to refer to the low level native calls (e.g., network events). The UDP send, receive and close events are critical events in DJVM.

The following Java code, called DatagamClient, describes a typical example of how a Java client creates a UDP datagram and sends it to the server.

```
100: void DatagramClient(byte[ ] data, String serverNane,
    int port)
101: {
102: InetAddress sever =InetAddress.getByName
    (serverName);
103: DatagramSocket dsocket =new DatagramSocket( );
104: dPacket =new DatagramPacket(data, data.length,
    server, Port);
105: dSocket.send(dPacket);
199:}
```

Line 103 creates a new DatagramSocket, line 104 creates a new DatagramPacket, and line 105 sends the DatagramPacket to the DatagramSocket.

The following Java code, called DatagramServer, describes a typical example of how a Java server receives a UDP datagram.

```
200: void DatagramServer(byte[ ] data, int port)
201: {
202: DatagramSocket sSocket =new DatagramSocket(port);
203: sPacket =new DatagramPacket(data, data.length);
204: dSocket.receive(sPacket);
205:}
```

Line 202 creates a new DatagramSocket, line 203 creates a new receive-buffer DatagramPacket, and line 204 receives incoming DatagramPacket and stores it into the DatagramPacket created at line 203.

For the record phase, the following pseudo code, called DataGramSendRecord, corresponds to the implementation of DatagramSocket.send(DatagramPacket packet). An example invocation thereof is shown in line 105 above, for the record phase. DGNetEventIdis a the pair <dJVMId, dJVMgc>, where dJVMId is the id of the sender DJVM and dJVMgc is the globalcounter at the sender DJVM associated with the send event.

```
300: final static int NetworkEventIdLength 8; // b bytes
301: final static int TagLength=1;
302: final static byte WHOLE_UDP=0; // whole udp
303: final static byte FRONT_UDP=1; // front of a split udp
304: final static byte REAR_UDP=2; // rear of a split udp
305: void DatagramSendRecord(DatagramPacket dp)
306: {
307: int dpLength=dp.getLength( );
308:    DGNetEventId    DGnetventId
    GenerateNetworkEventId( );
309: if ((dpLength+NetworkEventIdLength+TagLength)<=
    MAX_UDP_LENGTH)
310: {// no need to split
    // just append DGNetEventId and WHOLE_UDP tag
311: dp=Append(dp, DGNetEventId);
312: send(dp); // real send of the OS
313: }
314: else
315: {// need to split dp into two dp's
316: DatagramPacket dp2=SplitRear(dp, DGNetEventId);
317: dp=SplitFront(dp, DGNetEventId);
318: send(dp); // real send of the OS
319: send(dp2); // real send of the OS
320: }
321:}
```

During the record phase, the sender DJVM intercepts a UDP datagram sent by the application, called an application datagram, and inserts the DGNetEventId of the send event at the end of the data segment of the application datagram. The DJVM also increases the length field of the datagram to include the added size for the datagram id. At line 311, Append (dp, DGNetEventId) appends DGNetEventId and WHOLE_UDP tag at the end of dp. It also increases the length field of the DatagramPacket accordingly.

The datagram size, due to appending DGNetEventId (and the tag), can become larger than the maximum size allowed for a UDP datagram (e.g., usually limited by 32K). When this happens, the sender DJVM splits the application datagram into two, which the receiver DJVM combines into one datagram again at the receiver side.

At line 316, SplitRear(dp, . . . ) creates a new Datagram-Packet dp2 from the end of dp such that dp.getLength( )–dp2.getLength( ) equals MAX_UDP_LENGTH–(NetworkEventLength+1): it will give enough room at the end of dp to append DGNetEventId and the one-byte long tag. It will also append DGNetEventId and REAR_UDP tag to the end of dp2, and also increases the length field of dp2 accordingly.

At line 317, SplitFront( . . . ) will insert DGNetEventId and FRONT_UDP tag at the end of dp, and update the length field of dp as MAX_UDP_LENGTH. The split datagrams carry the same DGNetEventId, but different tags, FRONT_UDP or REAR_UDP, to indicate the to portion (e.g., front or rear), it represents so that it can be combined correctly at the receiver. A non-split datagram carries its own tag, WHOLE_UDP, that distinguishes it from a split datagram.

Line 308 generates a new DGNetEventId by atomically incrementing gCounter of the client thread.

The following pseudo code, called DataGramReceiveRecord, corresponds to the implementation of DatagramSocket.receive(DatagramPacket packet), an example invocation of which is shown in line 204 above, for the record phase.

```
400: void DatagramReceiveRecord(DatagramPacket dp)
401: {
402: int rGCounter =GetNewGCounter( );
403: for(;;) ({// forever (not really)
404: receive(dp); // real receive of OS
405: DGNetEventId dgramId =GetNetworkEventId(dp);
406: byte tag GetTag(dp);
407: if (tag ==WHOLE UDP)
408: {// whole udp received.
409: AdjustLength(dp);
410: RecordDatagramLog(rGCounter, dgramId);
411: return; // terminate the loop
412:}
413: else if (tag ==FRONT UDP)
414: { // check if the next is REAR_UDP
415: DatagramPacket dp2=new DatagramPacket( . . . );
416: receive(dp2);
417: DGNetEventId did =GetNetworkEventId(dp2);
418: byte tag =GetTag(dp2);
419: if (tag ==WHOLE_UDP)
420: {// well, we will forget about the FRONT_UDP
     // and just return dp2 as the new dp
421: AdjustLength(dp2);
422: RecordDatagramLog(rGCounter, dId);
423: CopyIntoDp (do, dp2);
424: return;
425:}
426: else if ((tag ==REAR_UDP) && (dgramId ==dId))
427: { // matched one is found; combine into one
428: combineDatagram(dp, dp2);
429: RecordDatagramLog(rGCounter, dgramId);
430: return; // terminate the loop
431: }
432: // forget about both hdp and dp2, and repeat loop
433:}// if (tag ==FRONT_UDP)
434: else // tag ==REAR_UDP .
435: {
436: . . . // similar code between Line 414 and 433
     // except that it will look for matching
     // FRONT_UDP, not REAR_UDP.
427: }
428:}// for (;;)
429:}
```

The receiver DJVM first checks the tag of the received DatagramPacket dp. If the tag is WHOLE_UDP (Line 407), it logs the received datagram into a log called RecordedDatagramLog (Line 410) and returns with the received dp (Line 411). Each entry in the log is a tuple <ReceiverGCounter; datagramId>, where ReceiverGCounter is the global counter value at the receive event in the receiver DJVM, datagramId is the DGNetEventId of the received datagram. GetNetworkEventId (Line 405) extracts the DGNetEventId from a received DatagramPacket, and GetTag (Line 406) extracts the tag from the received packet. AdjustLength (Line 409) decreases the length field of the received packet by the combined length of DGNetEventId and the tag.

Multiple datagrams with identical DGNetEventId are also recorded during the record phase. It is noted that the same datagram can be delivered more than once during the record phase, all of which must be delivered to the application during record and replay.

If the tag is FRONT_UDP (Line 413), the DJVM receives the next packet and check it is the matching REAR_UDP. If so (Line 426), it combines the two UDP packets into one packet, and logs the received datagram into the log (Line 428). It then returns (Line 430). If the new packet (e.g., the next packet, is itself a whole UDP (tag is WHOLE_UDP), the DJVM discards the first packet, copies the new packet into the first packet (Line 423), and logs the new packet as the received packet. It then returns (Line 424).

If none of the above two cases applies, the DJVM discards both the first and the second packets, and repeats the entire receive loop at Line 403.

If the tag is REAR_UDP (Line 434), steps similar to the case of FRONT_UDP are taken, but looking for the matching FRONT UDP split packet (Lines 435 through 427).

Regarding the replay phase, for reliable delivery of User Datagram Protocol (UDP) packets during the replay, a reliable UDP mechanism is used that guarantees reliable, but possibly out of order, delivery of intrinsically unreliable UDP datagrams.

If no reliable UDP is available, a pseudo-reliable UDP can be implemented as part of the sender and the receiver DJVMs by storing sent and received datagrams and exchanging acknowledgment and negative-acknowledgment messages between the DJVMs. It is noted that a datagram delivered during replay can be ignored if it was not delivered during record.

Given a reliable UDP mechanism, deterministic delivery of UDP packets to the application is similar to the mechanism described before for deterministic socket connection (e.g., in the above-mentioned U.S. patent application Ser. No. 08/956, 717). For UDP delivery, the DGNetEventId of each UDP packet is used for uniquely identifying each datagram. A datagram entry that has delivered multiple times during the record phase due to duplication is kept in the buffer until it is delivered to the same number of read requests as in the record phase.

Multicast datagram sockets can be easily supported by extending the support for datagram sockets. The send needs to send the same packet(s) to all the target sockets, instead of to only one. The receiver need not be changed.

Open and Mixed World Cases

In the open world case, only one component of the distributed application is running on a DJVM. Network events, in this case, are handled as general input/output (I/O). That is, any input messages are fully recorded including their contents during the record phase. During the replay phase, any network event at the receiver DJVM is performed with the recorded data, not with the real network data.

For example, a receive datagram socket event during the replay phase returns a datagram object created from the data recorded during the record phase. During the record phase, a client DJVM requesting a stream socket connection to a non-DJVM server logs the results. During the replay phase, the results of the corresponding connection request are retrieved from the log. The actual operating system-level connect call is not executed. Likewise, any message sent to a non-DJVM thread during the record phase need not be sent again during the replay phase.

In a mixed-world case, some components of the application are running on DJVM and others on non-DJVM. If the environment is known before the application executes, one could simply fall back on the DJVM scheme for the open-world case. However, with a slightly more machinery, it is possible to optimize on space overheads by using the closed-world scheme for communication with DJVMs and saving additional state during the communication with non-DJVMs.

As shown in FIG. 13, in addition to the hardware and process environment described .m above, a different aspect of the invention includes a computer-implemented method for recording and replaying execution of the distributed Java programs, as described above. As an example, this method may be implemented in the particular hardware environment discussed above with regard to FIG. 1.

Such a method may be implemented, for example, by operating the CPU 116 (FIG. 1), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 2 and hardware above, to perform a method of recording and replaying execution of distributed Java programs.

This signal-bearing media may include, for example, RAM 114 contained externally or within the CPU 116, as represented by fast-access storage for example. Alternatively, the instructions may be contained in another signal-bearing media, such as data storage 130 (FIG. 1) or a magnetic data storage diskette 1300 (FIG. 13), directly or indirectly accessible by the CPU 116.

Whether contained in the diskette 1300, the computer 100, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CAROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, while the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for recording and replaying execution of distributed programs on a computer system in a distributed environment, comprising:

identifying an execution order of critical events of a program;

generating groups of critical events of said program, wherein for each group, critical events belonging to said group belong to a common execution thread; and generating, for each execution thread, a logical thread schedule that identifies a sequence of said groups so as to allow deterministically replaying a non-deterministic arrival of stream socket connection requests, a non-deterministic number of bytes received during message reads, a non-deterministic binding of stream sockets to local ports, and a non-deterministic arrival of datagram messages, wherein said deterministically relaying comprises recording events of a plurality of virtual machines, each virtual machine being assigned a unique virtual machine identity during a record phase.

2. The method according to claim 1, wherein a virtual machine in said distributed environment is modified to record events.

3. The method according to claim 2, wherein virtual machines in said distributed environment communicate with one another and events are recorded on each virtual machine.

4. The method according to claim 1, further comprising:

recording an arrival order of a message to guarantee the order and replay of applications.

5. The method according to claim 1, wherein said deterministically replaying includes:

modifying an implementation of a virtual machine of said distributed environment to record information on what transactions are occurring at an application level and using said information to replicate a same behavior in a replay.

6. The method according to claim 5, wherein an implementation of said virtual machine of said distributed environment is modified without changing an application being run.

7. The method according to claim 5, wherein said modified virtual machine is operable in a record mode such that logical thread schedule information and network interaction information of the execution are recorded while an application program runs, and in a replay mode, such that the execution behavior of the program is reproduced by enforcing the recorded logical thread schedule and the network interaction.

8. The method according to claim 1, wherein said recording events of said plurality of virtual machines has applications on each machine and has threads of a same application program running, said recording of said events providing a deterministic replay of events.

9. The method according to claim 1, wherein each of a plurality of virtual machines in said distributed environment records events at each said machine, and each said virtual machine communicates with one another, to guarantee the same execution order for the replay of any shared applications on said each virtual machine.

10. The method according to claim 1, wherein said program includes critical and non-critical events, and wherein said method further includes:

recording said critical events and logging a value of a global counter and a local counter, a single said global counter residing on a virtual machine, and said local counter residing on each thread of a virtual machine associated with said critical event.

11. The method according to claim 1, wherein said replay is based on logical thread schedules and logical intervals.

12. The method according to claim 1, wherein said replay is for a non-deterministic arrival of point-to-point steam socket connection requests.

13. The method according to claim 1, wherein said replay is for a non-deterministic number of bytes received during point-to-point strewn socket message reads.

14. The method according to claim 1, wherein said replay is for a non-deterministic binding of stream sockets to local ports.

15. The method according to claim 1, wherein said replay is for a point-to-point datagram User Datagram Protocol (UDP) message sent to a single receiver.

16. The method according to claim 1, wherein said replay is for a point-to-points datagram User Datagram Protocol (UDP) message sent to multiple receivers.

17. The method according to claim 1, wherein said replay is for a non-deterministic arrival of number of bytes of point-to-point stream socket data.

18. The method according to claim 1, wherein replaying of a multithreaded program includes:

capturing a logical tread schedule information during one execution of the program; and enforcing an exact same schedule when replaying the execution.

19. The method according to claim 18, wherein said logical thread schedule comprises all of a plurality of physical thread schedules in an equivalence class.

20. The meth according to claim 18, wherein critical events belonging to a given group are represented by an ordered pair of <FirstCriticalEvent[i], LastCriticalEvent[i]>, and wherein FirstCriticalEvent[i] identifies the first critical event in the interval i and LastCriticalEvent[i] identifies the last critical event in de interval i.

21. The method according to claim 1, wherein each of said critical events represent one of a shared-variable access and a synchronization operation, said critical events affecting logical thread schedules, said synchronization operation comprising one of a synchronized block and wait synchronization operation, a monitorenter synchronization operation, and a monitorexit synchronization operation, wherein a different thread enters the critical section only after a first thread has executed the monitorexit operation.

22. The method according to claim 21, wherein said critical events further include wait, notify, and notify All synchronization operations for coordinating the execution order of multiple threads, and an interrupt synchronization operation that interrupts the execution of a thread at any point.

23. The method according to claim 1, wherein critical events comprise events whose execution order affect the execution behavior of the application, wherein a logical thread schedule comprises a sequence of intervals of critical events, and wherein each interval corresponds to the critical and non critical events executing consecutively in a specific thread.

24. The method according to claim 1, wherein for each given group of critical events, said critical events of the interval are consecutive, and only non-critical events can occur between consecutive critical events in the interval, and wherein said groups are ordered and no two adjacent intervals belong to the same thread.

25. The method according to claim 1, wherein only a critical event interval comprising a first critical event and a last critical event is traced and recorded.

26. The method according to claim 25, wherein a value of FirstCriticalEvent[i] and LastCriticalEvent[i] represent a global clock value that indicates the time that a corresponding event was executed, and is recorded, wherein such global clock values identify the ordering of events in an execution stream.

27. The method according to claim 1, wherein a logical schedule interval LSI[i] corresponding to an intervali when the specific thread is scheduled for execution identifies the critical events that occur in the interval i.

28. The method according to claim 1, wherein each said critical event is identified by a global counter value that reflects an execution order of said critical events.

29. The method according to claim 1, wherein capturing logical thread schedule information is based on a global counter shared by all the threads and one local counter exclusively accessed by each thread, wherein the global counter increments at each execution of a critical event to uniquely identify each critical event, and wherein a FirstCEventi and a LastCEventi are represented by their corresponding global counter values, and wherein the global counter is global within a particular virtual machine and each said virtual machine includes a different global counter, and a local counter increments at each execution of a critical event, such that a difference between the global counter and a threads local counter is used to identify dynamically the logical schedule interval.

30. The method according to claim 1, wherein each critical event is uniquely associated with a global counter value, and wherein global counter values determine the order of critical events.

31. The method according to claim 30, wherein updating the global counter for a critical event and executing the critical event, are performed in one atomic operation for shared-variable accesses.

32. The method according to claim 1, wherein updating the global counter and executing the event both in one single atomic operation is only performed during the record phase.

33. The method according to claim 1, wherein for a thread to execute a schedule interval LSI i =<FirstCEventi; LastCEventi>, during the replay phase, the thread waits until the global counter value becomes the same as FirstCEventi without executing any critical events, and when the global counter value equals FirstCEventi, the thread executes each critical event and also increments the global counter value until the value becomes the same as LastCEventi, and wherein when the global counter value equals LastCEventi, the thread fetches its next schedule interval, LSIi+1-<FirstCEventi+1; LastCEventi+1>, from the log and waits until the global counter value becomes the same as FirstCEventi+1, an operation being repeated until no more schedule intervals exist in the log.

34. The method according to claim 1, wherein for point-to-point communication, a socket is created, and getInputStream( ) and getOutputStream( ) of the Socket object return InputStream and OutputStream objects to be used for reading via a read ( ) method call and writing via a write( ) method call stream data over the socket stream, wherein a plurality of socket application programming interfaces (APIs) are provided including socket APIs for listening for connections on a stream socket via a listens method call, binding a socket to a local port via a bind ( ) method call, and determining the number of bytes that can be read without blocking via an available( ) method call, and wherein each stream socket call including accept( ), bind, create( ), listen( ), connector close ( ), available ( ), read ( ), and write ( ) is mapped into a native method call in a virtual machine implementation.

35. The method according to claim 1, wherein deterministic replay of network events comprises deterministic re-establishment of socket connections among threads.

36. The method according to claim 8, wherein said unique virtual machine identity logged in the record phase and reused in a replay phase, to allow identification of a sender of a message or connection request.

37. The method according to claim 1, wherein critical events on a virtual machine are identified by their global counter value on the virtual machine, and a networkEventId is used to uniquely identify a network event in a distributed application, and wherein said networkEvenId is defined as a tuple <threadNum, eventNum>, where threadNum is a thread number of a specific thread executing the network event and eventNum is a number that identifies the network event within the read, said eventNum being used to order network events within a specific thread.

38. The method according to claim 37, wherein a connectionId is for identifying a connection request at a connect network event, said connectionId is a tuple, <dJVMId, threadNum>, where did is the identity of the virtual machine at which the connect event is being generated, and threadNum is the thread number of the client thread generating the connection request.

39. The method according to claim 38, wherein said threadNum has a same value in both the record and replay phases, and wherein events are sequentially ordered within a thread, and the eventNum of a particular network event executed by a particular thread is guaranteed to be the same in the record and replay phases.

40. The method according to claim 39, wherein, in the record phases at the connect, a virtual machine-client sends a socket-connection request to a server, when the socket connection is established, the client thread on the virtual machine-client sends the connectionId for the connect over the established socket as the first data.

41. The method according to claim 39, wherein, in the replay phase, the virtual machine-client executes the connect and sends the connectionId of the connect to the server as the first data, said connect being a critical event, such that the virtual machine-client ensures that the connect call returns only when the globalCounter for this critical event is reached.

42. The method according to claim 41, wherein, on the server side, during the record phase, at an accept, a virtual machine-server accepts the connection and receives the connectionId sent by the client as the first data at the corresponding connect, the virtual machine-server logging information about the connection established into the NetworkLogFile, and wherein for each successful accept call, the log contains ServerSocketEntry, said ServerSocketEntry comprising a tuple, <serverId, clientId >, wherein said serverId is the networkEventId of the correspondingaccept event and wherein said clientId is the connectionId sent by the virtual machine-client.

43. The method according to claim 1, wherein a network operation is marked as a critical event, thereby allowing threads performing operations on different sockets to proceed in parallel.

44. The method according to claim 1, wherein during a record phase having a client that performs a connect and a server that performs an accept, a method comprising:

on the client side, performing a recording of critical events including enterGCCriticalSection, updating ClientGC, and leaveGCCriticalSection;

sending a connection request to the server side;

on the client side, sending a ClientEventID as a tuple comprising <clientJVMId, ClientGC>to the server;

on the server side, receiving the ClientEventID and logging, by the server side, <ServerGC, ClientEventID>into a ServerSocketLog.

45. The method according to claim 44, wherein, for replaying accept events, a virtual machine includes a connection pool for buffering out-of-order connections, wherein during the replay phase, when an accept is executed by a server threadt_son the virtual machine-server, said virtual machine-server identifies a networkEventId for the accept event, and wherein a connectionId is identified from a NetworkLog-File with matching networkeventId value, and said virtual machine-server checks the connection pool to determine whether a Socket object has been created with a matching connectionId.

46. The method according to claim 45, wherein if the Socket object has been created, the Socket object is returned by said virtual machine-server to complete the accept, and wherein if the Socket object has not already been created with a the matching connectionId, the virtual machine-server buffers information about out-of-order connections in the connection pool until said virtual machine-server receives a connection request with the matching connectionId, said virtual machine-server then creating and returning a Socket object for the matching connection.

47. The method according to claim 45, wherein an accept on the server side during the replay mode includes:

recording critical events;

retrieving a ClientEventID which equals a recValue from the ServerSocketLog for a respective ServerGC;

checking the connection pool for the recValue, wherein if the recValue is in the connection pool, then the process ends, and wherein if the recValue is not in the connection pool then the method further comprises:

accepting a connection request and receiving the ClientEventId by the server, and determining whether the ClientEventId is not equal to the recValue, and if not equal, then saving the ClientEventId in the connection pool, and if it is determined that theClientEventId is equal to the recValue, then the process ends.

48. The method according to claim 47, wherein socket read and write events are identified as critical events in a virtual machine, and the virtual machine's global counter is updated for each of these calls, wherein in the record phase, the virtual machine executes the read and logs a thread-specific eventNum and number of bytes read numRecorded in a NetworkLogFile.

49. The method according to claim 48, wherein in the replay phase, at a corresponding read event, the virtual machine reads only the numRecorded number of bytes even if more bytes are available to read.

50. The method according to claim 48, wherein in the replay phase, at the corresponding read event, the virtual machine thread retrieves the numRecorded number of bytes from a NetworkLogFile corresponding to a current eventNum and the thread reads only the numRecorded bytes even if more bytes are available to read, or will block until numRecorded bytes are available to read, and
   wherein the execution returns from the read call only when the globalCounter for the critical event is reached.

51. Me method according to claim 50, wherein during a record mode, for a read( ) method call, the read event is executed, returning "n" bytes read which is logged in a recordedValue, and the critical event corresponding to the read is logged.

52. The method according to claim 50, wherein during a replay mode for a read( ) method call, the read critical event is executed returning the number n of bytes read,
   wherein if n is greater than the recorded value, the read critical event is executed again, and wherein if n is less than the recorded value, the read critical event is executed again and bytes are read until the recordedValue number of bytes are read, and
   wherein when n is equal to recorded value, then the read critical event is recorded by performing a enterGcCriticalSection and leaveGcCriticalSection, and the process stops.

53. The method according to claim 52, wherein for multiple writes on a same socket, replaying of the writes to the same socket occur in a same order and all reads from the socket read the bytes in a same order in both record and replay modes.

54. The method according to claim 53, wherein an occurrence of multiple writes to a same socket are recorded, without recording other events that do not operate on the same socket, and
   wherein said events that do use the same socket are blocked by using a lock variable for each socket.

55. The method according to claim 54, wherein an enterFDCriticalSection(socket) allows only reads or writes corresponding to that socket to execute the code therein, thereby preserves an execution ordering of different critical events.

56. The method according to claim 53, wherein available and bind call events comprise critical events, and implement a network query,
   wherein said available call checks a number of bytes available on the stream socket, and said bind call returns a local port to which the socket is bound;
   wherein said available call comprises a blocking call, and in the record phase, is executed before enter a GC-critical section, and the virtual machine records a number of bytes available,
   wherein in the replay phase, the available call event blocks until it returns the recorded number of bytes available on the stream socket,
   wherein said bind event, in the record phase, is executed within the GC-critical section and the virtual machine records its return value.

57. The method according to claim 1, wherein user datagram protocol sockets are created via a DatagramSocket class, and
   wherein during a record phase, a sender virtual machine intercepts a datagram sent by an application and inserts a DGNETEventId of a send event at an end of a data segment of the application datagram, and the virtual machine increases a length field of the datagram to include an added size for a datagram identification.

58. The method according to claim 57, wherein if the datagram is larger than a predetermined size, said datagram is split, with each split datagrams carrying the same DGNETEventId, and different tags including one of FRONT_UDP and REAR_UDP, to indicate one of a front portion or rear portion.

59. The method according to claim 58, wherein if said datagram is less than or equal to the predetermined size, then the datagram carries information that it is a whole datagram.

60. The method according to claim 1, wherein for point-to-point communication, a socket is created,
   wherein a plurality of socket application programming interfaces (APIs) are provided including socket APIs for listening for connections on a steam socket, binding a socket to a local port, and determining the number of bytes that can be read without blocking, and
   wherein each stream socket call is mapped into a native method call in a virtual machine implementation.

61. The method according to claim 1, wherein in a replay phase, at a corresponding read event, a virtual machine reads only numRecorded number of bytes even if more bytes are available to read.

62. A method for supporting execution replay with respect to a stream socket Application programming interface (API) comprising:
   identifying an execution order of critical events of a program;
   generating groups of critical events of said program, wherein for each group, critical events belonging to said group belong to a common execution thread; and
   deterministically replaying non-deterministic arrival of stream socket connection requests, non-deterministic number of bytes received during message reads, and non-deterministic binding of stream sockets to local ports,
   wherein said deterministically replaying comprises recording events of a plurality of virtual machines, each virtual machine being assigned a unique virtual machine identity during a record phase.

63. A method for supporting execution replay with respect to datagram socket Application Programming Interface (API) including:
   identifying an execution order of critical events of a program;
   generating groups of critical events of said program, wherein for each group, critical events belonging to said group belong to a common execution thread;
   determining out-of-order delivery of packets; and
   determining a non-deterministic number of packets delivered during different executions of the same program, for supporting an execution replay with respect to said datagram socket Application Programming Interface (API),
   wherein said execution replay comprises recording events of a plurality of virtual machines, each virtual machine being assigned a unique virtual machine identity during a record phase.

64. The method according to claim 63, wherein packets are sent to multiple receivers.

65. The method according to claim 64, wherein said replaying flows repeating the exact behavior of thread execution and events in a distributed environment.

66. A software facility system for allowing recording and replaying execution of distributed programs on a computer system in a distributed environment, comprising:
- a first module for identifying an execution order of critical events of a program;
- a second module for generating groups of critical events of said program, wherein for each group, critical events belonging to said group belong to a common execution thread; and
- a third module for generating, for each execution thread, a logical thread schedule that identifies a sequence of said groups so as to allow deterministically replaying a non-deterministic arrival of stream socket connection requests, a non-deterministic number of bytes received during message reads, a non-deterministic binding of stream sockets to local ports, and a non-deterministic arrival of datagram messages,
- wherein said deterministically replaying comprises recording events of a plurality of virtual machines, each virtual machine being assigned a unique virtual machine identity during a record phase.

67. A software facility system for supporting execution replay with respect to a stream socket Application programming interface (API) comprising:
- a first module for identifying an execution order of critical events of a program;
- a second module for generating groups of critical events of said program, wherein for each group, critical events belonging to said group belong to a common execution thread; and
- a third module for deterministically replaying non-deterministic arrival of stream socket connection requests, non-deterministic number of bytes received during message reads, and non-deterministic binding of stream sockets to local ports,
- wherein said deterministically replaying comprises recording events of a plurality of virtual machines, each virtual machine being assigned a unique vial machine identity during a record phase.

68. A software facility system for supporting execution replay with respect to datagram socket Application Programming Interface (API) including:
- a first module for identifying an execution order of critical events of a program;
- a second module for generating groups of critical events of said program, wherein for each group, critical events belonging to said group belong to a common execution thread;
- a third module for determining out-of-order delivery of packets; and
- a fourth module for determining a on-deterministic number of packets delivered during different executions of the same program, to support an execution replay with respect to said datagram socket Application Programming Interface (API),
- wherein said execution replay comprises recording events of a plurality of virtual machines, each virtual machine bang assigned a unique virtual machine identity during a record phase.

69. A programmable storage medium tangibly embodying a program of machine-readable instructions executable by a digital processing apparatus to perform a method of recording and replaying execution of distributed programs on a computer system in a distributed environment, said method comprising:
- identifying an execution order of critical events of a program;
- generating groups of critical events of said program, wherein for each group, critical events belonging to said group belong to a common execution thread; and
- generating, for each execution thread, a logical thread schedule that identifies a sequence of said groups so as to allow deterministically replaying a non-deterministic arrival of stream socket connection rests, a non-deterministic number of bytes received during message reads, a non-deterministic binding of stream sockets to local ports, and a non-deterministic arrival of datagram messages,
- wherein said deterministically replaying comprises recording events of a plurality of virtual machines, each virtual machine being assigned a unique virtual machine identity during a record phase.

70. A programmable storage medium tangibly embodying a program of machine-readable instructions executable by a digital processing apparatus to perform a method for supporting execution replay with respect to a stream socket Application programming interface (API), said method comprising:
- identifying an execution order of critical events of a program;
- generating groups of critical events of said program, wherein for each group, critical events belonging to said group belong to a common execution thread;
- deterministically replaying non-deterministic arrival of stream socket connection requests, non-deterministic number of bytes received during message reads, and non-deterministic binding of stream sockets to local ports, and
- wherein said deterministically replaying comprises recording events of a plurality of virtual machines, each virtual machine being assigned a unique virtual machine identity during a record phase.

71. A programmable storage medium tangibly embodying a program of machine-readable instructions executable by a digital processing apparatus to perform a method for supporting execution replay with respect to datagram socket Application Programming Interface (API), said method including:
- identifying an execution order of critical events of a program;
- generating groups of critical events of said program, wherein for each group, critical events belonging to said group belong to a common execution thread;
- determining out-of-order delivery of packets; and
- determining a non-deterministic number of packets delivered during different executions of the same program, for supporting an execution replay with respect to said datagram socket Application Programming Interface (API),
- wherein said execution replay comprises recording events of a plurality of virtual machines, each virtual machine being assigned a unique virtual machine identity during a record phase.

* * * * *